United States Patent [19]
Aleksic et al.

[11] Patent Number: 6,104,407
[45] Date of Patent: Aug. 15, 2000

[54] METHOD AND APPARATUS FOR PROCESSING FRAGMENT PIXEL INFORMATION IN A THREE-DIMENSIONAL GRAPHICS PROCESSING SYSTEM

[75] Inventors: Milivoje M. Aleksic, Richmond Hills; Daniel Wai-him Wong, Willowdale, both of Canada

[73] Assignee: ATI Technologies, Inc., Thornhill, Canada

[21] Appl. No.: 08/935,550

[22] Filed: Sep. 23, 1997

[51] Int. Cl.[7] ................................................. G06T 17/00
[52] U.S. Cl. ........................ 345/428; 345/422; 345/426; 345/431; 345/433; 345/441
[58] Field of Search ..................... 345/418, 419, 345/422, 426, 431, 433, 440, 441, 443, 421

[56] References Cited

U.S. PATENT DOCUMENTS 5,123,085  6/1992  Wells et al. ............................. 345/421
5,854,631  12/1998  Akeley et al. .......................... 345/419
5,864,342  1/1999  Kajiya et al. ........................... 345/418

*Primary Examiner*—Mark K. Zimmerman
*Assistant Examiner*—Kimbinh T. Nguyen
*Attorney, Agent, or Firm*—Markison & Reckamp, P.C.

[57] ABSTRACT

A method and apparatus for providing video graphics processing that includes anti-aliasing begins when a video graphics processor receives vertex parameters of an object-element and walks a first edge of the object element and a second edge of the object element. The video graphics processor walks the first and second edges based on calculations involving a decision corner and an error turn. The calculations indicate which direction to walk on a pixel by pixel basis, i.e., whether the walking should be in the major direction or the minor direction. The calculations also identify pixels that contain fragment pixel information, i.e., the pixels along the edges of the object element. For each fragment pixel, subpixel masks are created for each object element that is present in the fragmented pixel. From the subpixel masks, subpixel sequences are determined, which are used to produce pixel information of the fragment pixel.

27 Claims, 14 Drawing Sheets overlay sub-pixel masks
for pixel location (8,6)

METHOD AND APPARATUS FOR PROCESSING FRAGMENT PIXEL INFORMATION IN A THREE-DIMENSIONAL GRAPHICS PROCESSING SYSTEM

TECHNICAL FIELD OF THE INVENTION

The present invention relates generally to video graphics processing and more particularly to three-dimensional video graphics processing having anti-aliasing.

BACKGROUND OF THE INVENTION

The basic architecture of a computing device is known to include a central processing unit ("CPU"), system memory, input/output ports, an address generation unit ("AU"), program control circuitry, interconnecting buses, audio-processing circuitry, and video processing circuitry. As the technology of the computing device elements continues to advance, computing devices are being used in more and more commercial applications. For example, computing devices are used in video game players, personal computers, works stations, video cameras, video recorders, televisions, etc. The technological advances are also enhancing video quality, audio quality, and speed at which computing devices can process data. The enhancement of the video quality is a direct result of video graphic circuit evolution.

Video graphic circuits have evolved from providing simple text and two-dimensional images to relatively complex three-dimensional images. Such evolution began with high-end computers such as workstations, where the use of complex and costly circuitry is more commercial viable. For example, anti-aliasing started with high-end computers. In general, anti-aliasing is a technique that visually compensates for jagged edges of video displayed images that result because of the finite size of pixels. The visual compensation begins by creating subpixel masks for each object that is to be drawn within a pixel. The resulting subpixel masks for a pixel are then processed to produce pixel information for the given pixel. For example, assume that three objects are partially contained within a pixel. The first object has twenty-five percent (25%) coverage of the pixel. The second object has thirty percent (30%) coverage of the pixel. The third object has twenty-five percent (25%) coverage of the pixel. The remaining twenty-percent (20%) of the pixel is covered by background information. Each object, including the background, contributes to the pixel information of the pixel based on their respective percentages.

The process of generating subpixel masks and the resulting processing of the subpixel masks have been discussed in several prior art references such as "A New Simple and Efficient Anti-aliasing with Subpixel Masks," by Andreas Schilling, et. al., Computer Graphics, Volume 25, Number 4, July 1991, and "The A-buffer, an Anti-aliasing Hidden Surface Method," by Loren Carpenter, Computer Graphics, Volume 18, Number 3, July 1984. While each of these references discusses a viable means for producing anti-aliasing, the schemes were not designed in terms of optimizing memory.

As is generally known, the amount of memory required for any processing device directly affects the cost of the processing device. Thus, the more memory requirements can be reduced, the more inexpensively the processing device can be produced. To make anti-aliasing commercially viable to the general public, the cost of video graphic processing circuits needs to be reduced by reducing the memory requirements. Therefore, need exists for a commercially viable three-dimensional video graphics processing method and apparatus that includes video anti-aliasing.

DETAILED DESCRIPTION OF A PREFERRED EMBODIMENT

Generally, the present invention provides a method and apparatus for providing video graphics processing that includes anti-aliasing. This begins when a video graphics processor receives vertex parameters of an object-element (E.g., a triangle) and walks a fist edge of the object element (i.e., the left edge of the triangle) and a second edge of the object element (i.e., the right edge of the triangle). The video graphics processor walks the first and second edges based on calculations involving a decision corner and an error term The calculations indicate which direction to walk on a pixel by pixel basis, i.e., whether the walking should be in the major direction (in the x direction when $\Delta x$ is greater than $\Delta y$ or in the y direction when $\Delta y$ is greater than $\Delta y$), or the minor direction (in the y direction when Δx is greater than Δy or in the x direction when Δy is greater than Δx). The calculations also identify pixels that contain fragment pixel information, i.e., the pixels along the edges of the object element. For each fragment pixel, subpixel masks are created for each object element that is present in the fragmented pixel. From the subpixel masks, subpixel sequences are determined, which are used to produce pixel information of the fragment pixel. With such a method and apparatus, anti-aliasing is achieved with significantly less memory requirements because the calculations that are based on the decision corner and the error term allowing subpixel coverage to be determined at pixel resolution thereby reducing the memory and computational requirements by a factor of four or more.

Figure 1:
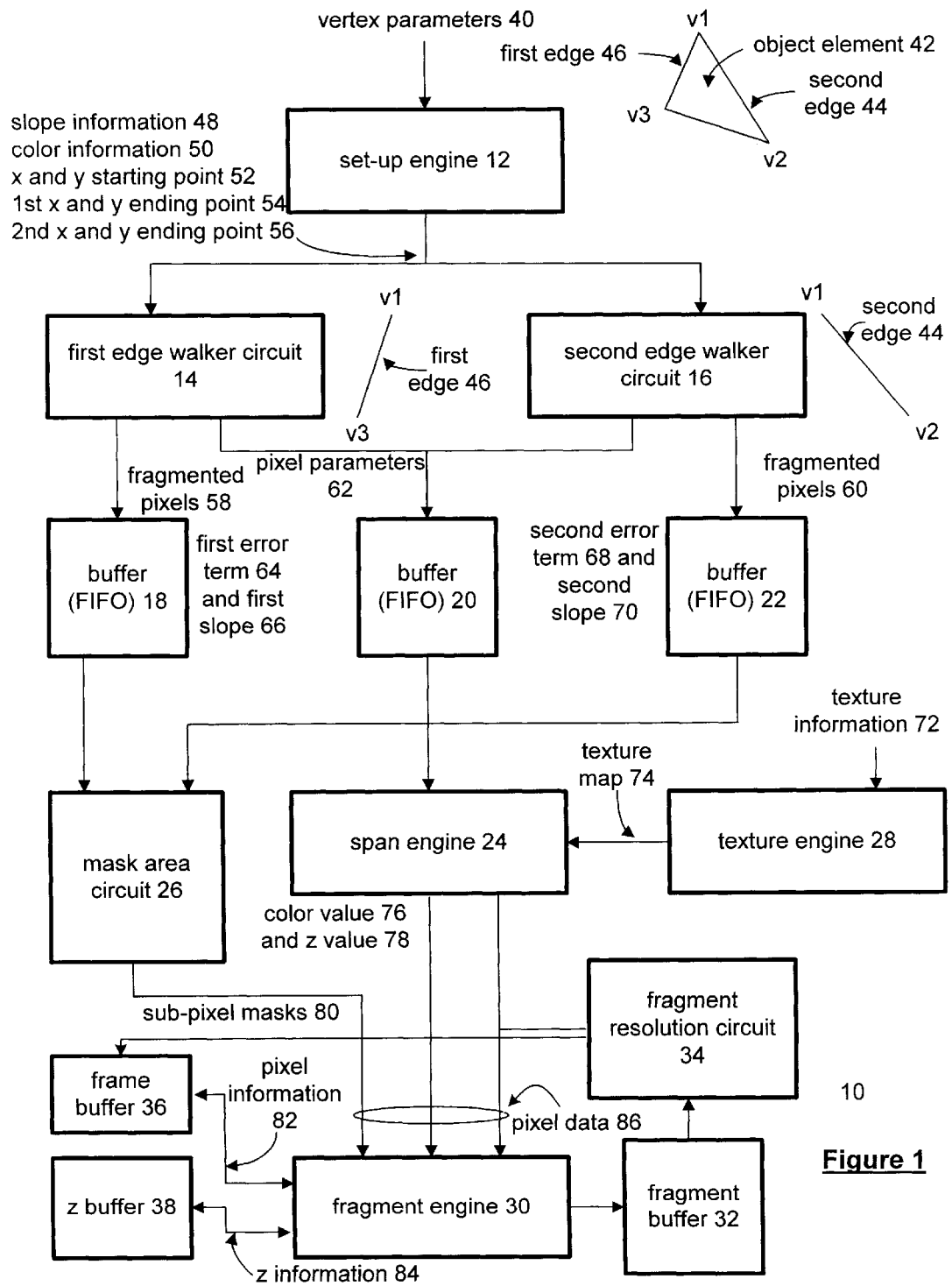
FIG. 1 illustrates a schematic block diagram of a three-dimensional video graphics processor that includes anti-aliasing in accordance with the present invention.

The present invention can be more fully described with reference to FIGS. 1 through 17. FIG. 1 illustrates a schematic block diagram of a video graphics processing circuit 10 that includes a set-up engine 12, a first and second edgewalker circuits 14 and 16, three first-in first-out ("FIFO") buffers 18–22, a mask area circuit 26, a span engine 24, a texture engine 28, a fragment engine 30, a fragment buffer 32, fragment resolution circuit 34, a frame buffer 36, and a Z buffer 38. The set-up engine 12 may be a microprocessor, micro-controller, digital signal processor, or portion of a video graphics processing circuit such as the one described in co-pending patent application entitled Method and Apparatus for Three-Dimensional Graphics Processing having a docket number of ATI-970404-1, Ser. No. 08/846,600, assigned to the same assignee as the present invention. In operation, the set-up engine 12 receives vertex parameters 40 for a particular object-element 42. The vertex parameters contain parameters relating to each vertex V1, V2 and V3 of the particular object-element 42, including the RGB color values, Z information, subpixel precision X and Y coordinates, texture information 72, and may further include YUV data Upon receiving the vertex parameters 40, the set-up engine 12 converts the information to slope information 48, color information 50, an X and Y starting point 52, a first X and Y ending point 54 and a second X and Y ending point of 56. The X and Y starting point 52 corresponds, for this illustration, to V1 of object-element 42. The first ending point 54 corresponds to vertex V3 of object-element 42. Thus, the X and Y starting point 52 (V1) and the X and Y ending point 54 (V3) define the first edge 46 of object-element 42. The second X and Y ending point 56 corresponds to vertex V2 of object-element 42 and is of subpixel precision. Thus, the X and Y starting point 52 (V1) and the second X and Y ending point 56 (V2) define the second edge 44 of object-element 42. The first X and Y ending point 54 and the second X and Y ending point define the third edge of the object element 42.

The X and Y starting point 52 and the first and second X and Y ending points 54 56 are of subpixel precision, i.e., subpixel precision allows for finer computational granularity of a display. For example, a display of 640 by 480 pixels has 640 pixels in the X direction and 480 pixels in the Y direction. Any pixel on the display can be addressed by its X and Y coordinates (E.g. 24, 343). Subpixel precision, at least from a mathematical standpoint, allows the display to have finer granularity by utilizing fractional pixel values (E.g. 24.25, 343.50). Since few object elements have boundaries that fall directly on whole pixel values (E.g. 24, 343), video calculations, namely anti-aliasing, use subpixel values to define the vertexes of the object elements thereby producing enhanced video quality.

The set-up engine provides the slope, color, starting point, initial error term, and ending point information 48, 50, 52, 54, 56 to the first and second edgewalker circuits 14 and 16. The first edgewalker circuit 14 walks the first edge 46 of the object-element 42 while the second edgewalker circuit 16 walks the second edge 44 of object-element 42. Either the first edgewalker circuit 14 or the second edgewalker circuit 16 walks the third edge of object-element 42. Regardless of which edgewalker circuit 14 or 16 processes the third edge, it will function in an identical manner as it does when processing the first or second edge.

The first edgewalker circuit walks the first edge 46 and identifies the pixels along the edge as being fragmented pixels 58 and further identifies these pixels as being on the left edge of the object element 42. The second edgewalker circuit 16 performs a similar function to identify Cemented pixels 60 along the second edge 44. To identify the fragmented pixels, the edgewalker circuits 14 and 16 utilize the slope and a decision corner to determine an error term The first edgewalker circuit 14 receives a first error term 64 from the set-up engine and causes the first error term 64 to be stored in buffer 18. The first slope 66 is also stored in the buffer 18. The second edgewalker circuit receives a second error term 68 from the set-up engine 12, where the second error term 68 is stored in buffer 22. The second slope 70 is also stored in the buffer 22. Generation of the error terms will be discussed in greater detail with reference to FIGS. 3, 4 and 6 below.

The first and second edgewalker circuits 14 and 16 further generate pixel parameters 62. The pixel parameters include a fragment pixel identifier, left edge or right identifier, X and Y subpixel starting points, and the corresponding color information 50. The fragment pixel identifier indicates whether the pixel is on an edge of the object element 42. The left or right edge identifier indicates whether, when the fragment pixel identifier is set, the fragment pixel is on the left edge or the right edge of the object element. The pixel parameters are stored in buffer 20.

The mask area circuit 26 receives the first and second error terms 64 and 68 and the first and second slopes 66 and 70 from buffers 18 and 22. Having received this information, the mask area circuit 26 generates a subpixel mask 80 for each pixel along the first edge and a subpixel mask for each pixel along the second edge. The subpixel masks are provided to the fragment engine 30. Generation of the subpixel mask will be discussed in greater detail with reference to FIGS. 2 through 5 below.

The span engine 24 receives the pixel parameters 62 from buffer 20 and generates color values 76 and Z values 78 for each pixel on and between the first and second edges. The color value 76 may be an RGB value, a YUV value, or texture parameters based on a texture map 74 received from the texture engine 28. For a further discussion on texture mapping refer to co-pending patent application entitled Method and Apparatus for Three-Dimensional Graphic Processing having a docket number of ATI-970404-1, Ser. No. 08/846,600, assigned to the same assignee as the present invention. The color value 76 and the Z value 78 are provided to the fragment engine 30. Collectively, the subpixel masks 80, the color value 76, and the Z value 78 are referred to as pixel data 86.

The fragment engine 30 processes the pixel data 86 for each pixel whether the pixel has only one object-element in it or multiple object-elements within its boundaries. For pixel data 86 that does not include a subpixel mask 80, which indicates that the pixel is fully covered by an object-element, the fragment engine 30 generates pixel information 82 from the color value 76. The fragment engines 30 routes the pixel information to the frame buffer 36, which stores the pixel information 82. The Lent engine 30 also provides the Z value 78, as Z information 84, to the Z buffer 38. Thus, for fully opaque, fully-covered pixels, the fragment engine 30 generates the pixel information 82 as discussed in co-pending patent application Method and Apparatus for Three-Dimensional Graphics Processing, Ser. No. 08/846,600, assigned to the same assignee as the present invention.

The fragment engine 30, for pixel data 86 that includes subpixel masks 80, stores fragment pixel information in the fragment buffer 32 and current pixel information in the frame buffer 82. The fragment pixel information corresponds to the subpixel mask 80 and includes the color value and related Z value for the particular pixel. To render final pixel information from the fragment pixel information, the fragment resolution circuit 34 receives the current pixel information from the frame buffer 36 and the fragment pixel information from the fragment buffer 32 and processes it based on a processing order. The fragment resolution circuit processed information is then provided to the fragment engine 30 which further processes the information and stores the newly processed information in the frame buffer 36. This continues until the final pixel information is generated, i.e., all of the objects that occupy a portion of the pixel have been processed. The fragment resolution circuit 34 established the processing order based on the fragment pixel information. Typically, the processing order is established based on the Z value, such that the fragment pixel information that is closer, i.e., having a smaller Z value, are processed before fragment pixel information having larger Z values. This processing will be described in greater detail with reference to FIGS. 13–15.

While the elements of the video graphics processing circuit 10 have been illustrated and discussed as separate processing devices and may be implemented as separate processing devices, the video graphics processing circuit 10 may also be implemented within a single processing device. For example, the video graphics processing circuit 10 may include memory that stores programming instructions and a processing unit that executes the programming instructions. The processing unit may be a microprocessor, a microcomputer, a microcontroller, a digital signal processor, or any other processing device that manipulates digital information based on programming instructions. Regardless of whether the video graphics processor 10 is implemented within a single processing unit or multiple processing units the overall video graphics processing circuit performs the functions illustrated in FIGS. 8 through 17.

Figure 2:
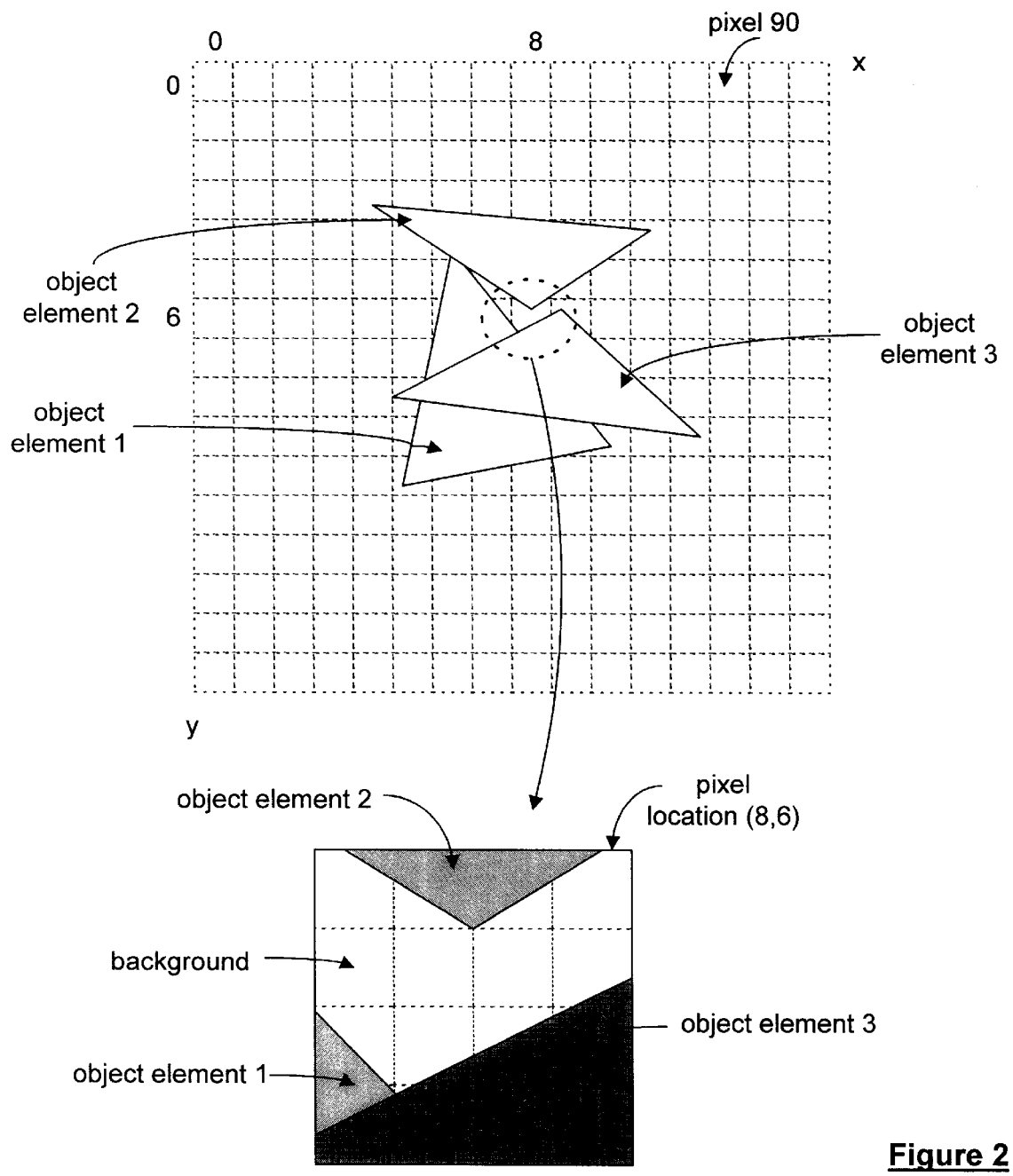
FIG. 2 illustrates a graphical representation of object elements that are to be drawn partially within a pixel in accordance with the present invention.

FIG. 2 illustrates a graphical representation of three object-elements 1, 2 and 3 rendered on a video screen that is divided into pixels 90. As shown, the pixel array is a two-dimensional array having an X-axis and a Y-axis. Note that the orientation of the X axis is positive going from the left of the page to the right of the page while the Y axis is in the positive direction going from the top of the page to the bottom of the page. Further illustrated is a particular pixel of interest, which is at pixel location (8,6).

The pixel at pixel location (8,6) is shown in greater detail at the bottom of FIG. 2. As shown, object-element 3 is overlaps object-element 1, indicating it is closer (has a smaller z value). Object-element 2 does not intersect with either of object-elements 1 or 3 while the remaining portion of the pixel location contains background information. Note that the background information may be another object-element or the actual background of the particular application being processed. Further note that in the blown up illustration of the pixel at pixel location (8,6), the pixel is divided into a plurality of subpixels. As shown, there are 16 subpixels in a 4×4 arrangement. As one skilled in the art will readily appreciate, the number of subpixels per pixel may vary depending on the particular subpixel resolution desired. But, as the number of subpixels per pixel increases, so does the memory requirements.

Figure 3:
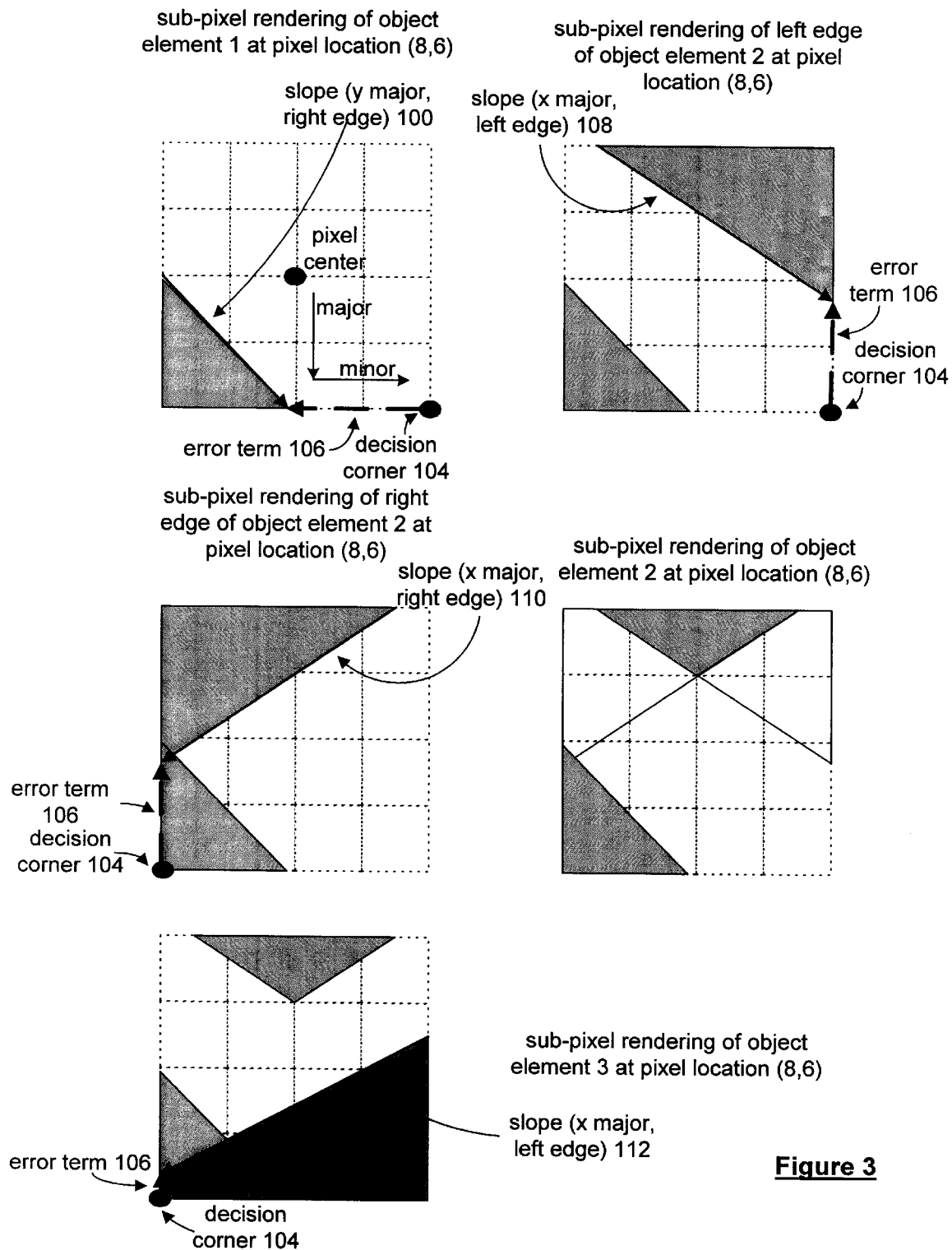
FIG. 3 illustrates the development of subpixel masks in accordance with the present invention.

FIG. 3 illustrates a step-by-step process of determining the error term for each of the object-elements shown in FIG. 2. In the upper-left corner of FIG. 3, the subpixel rendering of object-element 1 at pixel location (8,6) is shown. The slope 100 of the first object element is an Y-major slope, i.e., the change in the Y direction is greater than the change in the X direction. The slope 100 is also a positive slope (i.e., positive changes in the X direction correspond to positive changes in the Y direction) and the slope 100 is for the right edge of the object element.

For any pixel and edge, the decision corner 104 is determined by starting at the pixel center traveling in the major direction to the pixel edge and then in the minor direction to the pixel corner. As such, for Y major positive slopes, the decision corner 104 is positioned at the lower right-hand corner of the pixel. Based on the slope, a previous error term, and the decision corner, an error term 106 is determined. The previous error term would be obtained from the previous pixel that was walked by the edgewalker circuit. By adding the change in the walking direction to the previous error term, the new error term 106 is obtained. When the new error terms exceeds a threshold, a one is subtracted from the error term before the next error term is determined. When the new error term exceeds the threshold, it provides an indication that the next direction to walk is in the minor direction. This will be discussed in greater detail with reference to FIG. 6.

Before the slope can be added to the error term, an initial error term must be determined. The initial error term is determined based on the X and Y starting point of the object element, the slope 100, and the decision corner 104. In the original mid-point algorithm only the signs of the error term are inspected to determine walking directions, hence the error term can be properly scaled up to have the algorithm working with integer numbers. When antialiasing is desired, we need to know the exact error values as well as the slope of the crossing edges to generate coverage masks. As a consequence, we are forced to go back to floating point (or fixed point) numbers. To simplify discussion, let's take the same setup of Rage3, namely, vertices are sorted with increasing y coordinates. In this setting, $\Delta y$ is always positive and depending on the ratio between $|\Delta x|$ and $|\Delta y|$, edges can be categorized into two classes: x-major and y-major.

For walking a y-major edge, $|\Delta x|<|\Delta y|$, changes in x are always separated by changes in y as the edge is walked. As such, the walking never take successive steps in the x direction. Consider the case where $\Delta x$ is positive. To test if the walking should move in x or in y, the distance e, which is the deviation of intersection at pixel bottom edge measured from the bottom-right corner, is tested.

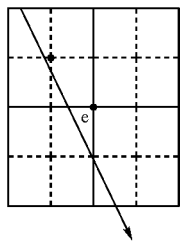

Given an edge with endpoints (xa, ya) and (xb, yb), the walking starts at (xs, ys)=(round(xa),round(ya)). Initially, $$e = (y_s + 0.5 - y_a)\frac{\Delta x}{\Delta y} - (x_s + 0.5 - x_a)$$

The value of e will be positive if intersection occurs at the east of the decision corner and negative otherwise. Define $\Delta = \Delta x/\Delta y$ and repeat the following until x=round(xb):
if e<0, go y++, and increment e by $\Delta$
otherwise, go x++, and decrement e by 1
When $\Delta x$ is negative, we obtain the distance e from the bottom-left corner,

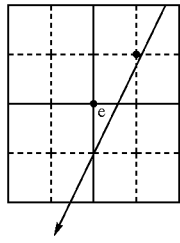

Given an edge with endpoints (xa, ya) and (xb, yb), walking starts at (xs, ys)=(round(xa),round(ya)). Initially, $$e = -(y_s + 0.5 - y_a)\frac{\Delta x}{\Delta y} + (x_s - 0.5 - x_a)$$

The value of e will be positive if intersection occurs at the west of the decision corner and negative otherwise. Define $\Delta A = |\Delta x|/\Delta y$ and repeat the following until x=round(xb):
if e<0, go y++, and increment e by $\Delta$
otherwise, go x--, and decrement e by 1
It would be beneficial to combine the two equations into one, which produces:

$$\begin{cases} e = (y_s + 0.5 - y_a)\Delta\frac{x}{\Delta y} - (x_s + 0.5 - x_a) & \text{if } \Delta x \geq 0 \\ e = -(y_s + 0.5 - y_a)\Delta\frac{x}{\Delta y} + (x_s - 0.5 - x_a) & \text{if } \Delta x < 0 \end{cases}$$

The term (xs+0.5−xa) is always positive while the term (xs−0.5−xa) is always negative. Hence a simple solution is to have $$e = (y_s + 0.5 - y_a)\frac{|\Delta x|}{\Delta y} - |x_s + \text{sign}(\Delta x) \times 0.5 - x_a|$$

For an x-major edge, $|\Delta x| \geq |\Delta y|$. The aforementioned strategy still applies, but with the roles of x and y interchanged.

It is more convenient to use major (j) and minor (n) directions instead of x and y directions. Further define jStep and nStep according to their signs, $$\begin{cases} jStep = \text{sign}(\Delta j) \\ nStep = \text{sign}(\Delta n) \end{cases}$$

Next, the discussion continues with j replacing y and n replacing x. Recapitulating the equation produces:

$$e = \Delta\left|j_s + \frac{1}{2}jStep - j_a\right| - \left|n_s + \frac{1}{2}nStep - n_a\right|$$

where $\Delta = \left|\frac{\Delta n}{\Delta j}\right|$

Note that e is always positive on the minor direction. Repeat the following until j=round(jb):
if e<0, go along j (j+=jStep) and increment e by $\Delta$
otherwise, go along n (n+=nStep) and decrement e by 1

Returning to the discussion of FIG. 3 and with the error term defined for the pixel the next step is to determine the coverage area of the pixel by the object element 1. The right edge information indicates that the coverage area of the pixel by the first object-element is to the left of the intersection of the pixel. The shaded area shows this. A more complete discussion of determining the coverage area will be discussed with reference to FIGS. 4 and 5.

The upper-left illustration of FIG. 3 depicts the subpixel rendering of the left edge of object element 2 at pixel location (8,6). Because the second object-element is at a vertex in pixel location (8,6), the subpixel rendering needs to be done in multiple steps. The first step is to determine the error term 106 for the left edge of object-element 2, as shown the error term 106 is based on a decision corner 104 which is in the lower-right hand corner of the pixel (determined by starting at the center of the pixel, traveling in the major direction to the pixel edge, and then in the minor direction to the pixel corner). The slope 108 of the left edge of object-element 2 is an X major slope and is positive because $|\Delta x|$ is greater than $|\Delta y|$ and $\Delta x>0$. Once the error term 106 has been determined as described above, the error term 106 for the right edge is determined. This is shown in the middle left illustration of FIG. 3. The subpixel rendering of the right edge of object-element 2 at pixel location 8,6 includes the decision corner 104 being in the lower-left corner. Further note that the slope 110 is an X major slope and is negative. From this information, the error term 108 is generated. Next, the middle-right illustration illustrates the subpixel rendering of object-element 2 at pixel location (8,6). This subpixel rendering is based on the overlapping between the coverage area based on the left slope and the right slope.

Figure 4:
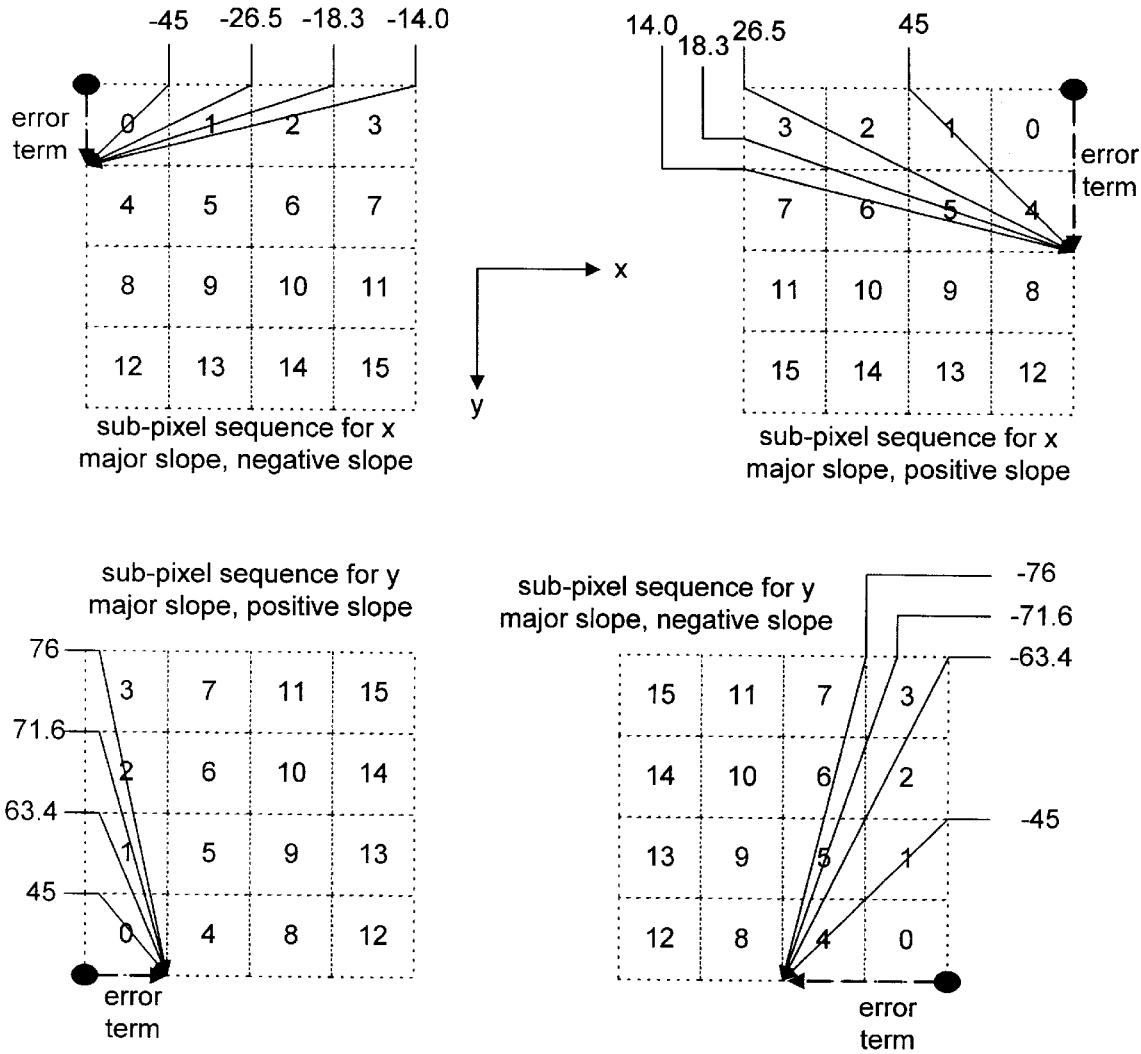
FIG. 4 illustrates the generation of subpixel sequences in accordance with the present invention.

The lower-left illustration of FIG. 3 illustrates the subpixel rendering of object-element 3 at pixel location 8,6. As shown, the decision corner is in the lower-left corner and the slope 112 is along an X major slope but is negative. The edge is a left edge thus producing the shaded coverage area as shown FIG. 4 illustrates one example of a plurality of subpixel sequences based on the error term and the decision corner and further illustrates an X and Y-axis, where the positive X direction is from the left to the right of the page and the positive Y direction is from the top of the page to the bottom of the page. As shown in the upper-left portion of FIG. 4, a subpixel sequence for an X major and negative slope is shown. The subpixel sequence is numbered from 0 to 15 as shown. Depending on the error term, the slope of the edge (wherein the slope is designated by degrees) and whether the edge is a right or left edge, the subpixel sequence can be determined. Note that FIG. 4 illustrates the symmetrical nature of the subpixel sequences with respect to major and minor axis.

In general, the subpixel sequence is determined as follows: By applying the principles of Schilling's algorithm for pixel coverage determination the sequences can be obtained. For example, because the walking is restricted with increasing y, and assume that inside is on the RHS, the sixteen sequences can be determined as.

| Major | Δ | Δx | Sequence |
|---|---|---|---|
| x | Δ ≦ 1/3 | − | 0 |
| x | 1/3 < Δ ≦ 1/2 | − | 1 |
| x | 1/2 < Δ ≦ 2/3 | − | 2 |
| x | 2/3 < Δ ≦ 1 | − | 3 |
| y | 2/3 < Δ ≦ 1 | − | 4 |
| y | 1/2 < Δ ≦ 2/3 | − | 5 |
| y | 1/3 < Δ ≦ 1/2 | − | 6 |
| y | Δ ≦ 1/3 | − | 7 |
| y | Δ ≦ 1/3 | + | 8 |
| y | 1/3 < Δ ≦ 1/2 | + | 9 |
| y | 1/2 < Δ ≦ 2/3 | + | 10 |
| y | 2/3 < Δ ≦ 1 | + | 11 |
| x | 2/3 < Δ ≦ 1 | + | 12 |
| x | 1/2 < Δ ≦ 2/3 | + | 13 |
| x | 1/3 < Δ ≦ 1/2 | + | 14 |
| x | Δ ≦ 1/3 | + | 15 |

For convenience, the sequence table is duplicated here:

| seq 0  | 15 | 14 | 13 | 12 | 11 | 10 | 9  | 8  | 7  | 6  | 5  | 4  | 3  | 2  | 1  | 0  |
|--------|----|----|----|----|----|----|----|----|----|----|----|----|----|----|----|----|
| seq 1  | 15 | 14 | 13 | 11 | 12 | 10 | 9  | 7  | 8  | 6  | 5  | 3  | 4  | 2  | 1  | 0  |
| seq 2  | 15 | 14 | 11 | 13 | 10 | 12 | 7  | 9  | 6  | 8  | 3  | 5  | 2  | 4  | 1  | 0  |
| seq 3  | 15 | 14 | 11 | 13 | 10 | 7  | 12 | 9  | 6  | 3  | 8  | 5  | 2  | 4  | 1  | 0  |
| seq 4  | 15 | 11 | 14 | 7  | 10 | 13 | 3  | 6  | 9  | 12 | 2  | 5  | 8  | 1  | 4  | 0  |
| seq 5  | 15 | 11 | 14 | 7  | 10 | 3  | 13 | 6  | 9  | 2  | 12 | 5  | 8  | 1  | 4  | 0  |
| seq 6  | 15 | 11 | 7  | 14 | 3  | 10 | 6  | 13 | 2  | 9  | 5  | 12 | 1  | 8  | 4  | 0  |
| seq 7  | 15 | 11 | 7  | 3  | 14 | 10 | 6  | 2  | 13 | 9  | 5  | 1  | 12 | 8  | 4  | 0  |
| seq 8  | 3  | 7  | 11 | 15 | 2  | 6  | 10 | 14 | 1  | 5  | 9  | 13 | 0  | 4  | 8  | 12 |
| seq 9  | 3  | 7  | 11 | 2  | 15 | 6  | 10 | 1  | 14 | 5  | 9  | 0  | 13 | 4  | 8  | 12 |
| seq 10 | 3  | 7  | 2  | 11 | 6  | 15 | 1  | 10 | 5  | 14 | 0  | 9  | 4  | 13 | 8  | 12 |
| seq 11 | 3  | 7  | 2  | 11 | 6  | 1  | 15 | 10 | 5  | 0  | 14 | 9  | 4  | 13 | 8  | 12 |
| seq 12 | 3  | 2  | 7  | 1  | 6  | 11 | 0  | 5  | 10 | 15 | 4  | 9  | 14 | 8  | 13 | 12 |
| seq 13 | 3  | 2  | 7  | 1  | 6  | 0  | 11 | 5  | 10 | 4  | 15 | 9  | 14 | 8  | 13 | 12 |
| seq 14 | 3  | 2  | 1  | 7  | 0  | 6  | 5  | 11 | 4  | 10 | 9  | 15 | 8  | 14 | 13 | 12 |
| seq 15 | 3  | 2  | 1  | 0  | 7  | 6  | 5  | 4  | 11 | 10 | 9  | 8  | 15 | 14 | 13 | 12 |

The following table illustrates the subpixel orientation of a pixel used to derive the subpixel sequences as described herein:

| 0 | 1 | 2 | 3 |
|---|---|---|---|
| 4 | 5 | 6 | 7 |

| 8  | 9  | 10 | 11 |
|----|----|----|----|
| 12 | 13 | 14 | 15 |

From the above tables, the area coverage is then estimated for the cases where inside is at the RHS of an edge. Because of the introduction of the concepts of major and minor directions, the symmetric nature of the various combinations (of signs of □x and □y and major axis) becomes obvious. Taking the simple case of major being the positive x and minor being the positive y.

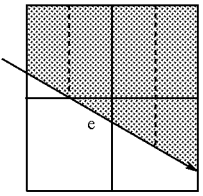

and obtained:
line crosses both left and right edges of pixel (bottom right pixel in the figure), e negative and $e-\Delta \geqq -1$, area is given by $1+e-(\Delta/2)$
line crosses top and right edges of pixel (bottom left pixel in the figure), e negative and $e-\Delta < -1$, area is given by $(1+e)^2/(2\Delta)$
line crosses bottom and left edges of pixel (top left pixel in the figure), e is positive, area is given by $1+e-(\Delta/2)-e2/(2\Delta)$ Note that the error measure actually tells the exact intersection at the exit border along the minor direction.

Figure 5:
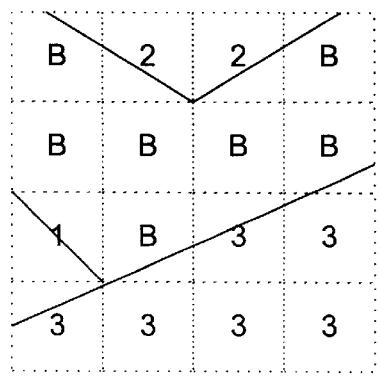
FIG. 5 illustrates a plurality of subpixel masks overlaid in accordance with the present invention.

FIG. 5 illustrates the resulting overlaid subpixel masks for pixel location (8,6) of FIG. 3. The overlaid subpixel masks are derived from the example error terms of FIG. 3 and the example subpixel sequences of FIG. 4. As shown, the proportional coverage area of the pixel 8,6 is determined based on the particular subpixel sequence and the Z value of each object element. Object-element 2 is fully visible since it does not overlap with either object-element 1 or 3. The subpixel coverage area of the second object-element is based on the commonality between the left edge subpixel sequence and the right edge subpixel sequence. Referring to FIGS. 3 and 4, the subpixel sequence for the left edge is 0–5 and 8. The subpixel sequence for the right edge is 0–3, 6, 7, and 11. Taking the common subpixels, the resulting subpixel sequence for this example is 0–3, hence the second object-element occupies the top four subpixels of pixel location 8,6. Note that if the subpixel sequence is based on a fifty percent or greater coverage area, only subpixels 1 and 2 would be covered by object element 2. Subpixels 0 and 3 would be covered by the background.

The subpixel sequence for object-element 1 includes 8, 12, and 13. Object-element 3, however, is closer than object-element 1 thus overlay object-element 1. The subpixel sequence for object element 3 includes subpixels 7, and 9–15. As shown, object-element 3 occupies 8 subpixel locations of pixel location 8,6, object-element 1 occupies one subpixel, object element 2 occupies 4 subpixels, and the background occupies 3 subpixels. Note that the subpixel sequence for object element 3 would change if the subpixel sequence were derived based on fifty percent coverage of the subpixel. As such, the subpixel sequence for object element 3 would include 9–15. Further note, that the subpixel sequence for object element 1 would not change with the fifty percent subpixel coverage area requirement since it includes only 1 subpixel, subpixel no. 8 and it meet the fifty percent subpixel coverage area requirement.

From the resulting sub-pixel mask overlay, the resulting pixel information may be rendered for this particular pixel. The particular rendering is based on the percentage of each object-element's coverage area of the pixel. As such, object-element 3 covers fifty percent (50%) of the pixel and has a fifty percent (50%) contribution to the color value. Object-element 1 covers 1/16th of the object-element and has only a 6.25% contribution to the color value. Object-element 2 covers 25% of the pixel and has a 25% contribution to the color value and the background covers three-sixteenths of the pixel and has a 18.75% contribution to the color value. By rendering the pixel information in this manner, anti-aliasing is achieved in an economical manner wherein a small amount of memory, in the order of 256 bytes, is needed to store the subpixel sequence.

The overlaying sub-pixel mask data may be stored in a variety of ways. For example, the subpixel data may be stored in a memory that has 16 locations, one for each subpixel location. The memory would then store the corresponding RGB color information of the object element occupying the subpixel location. Alternatively, the memory may be a floating size memory where it stores the color information of an occupying object element, the identity of the object element, and the subpixel location. As one of average skill in the art will readily appreciate, the manner in which the overlaying subpixel mask data is stored is dependent upon the requirements of the system.

Figure 6:
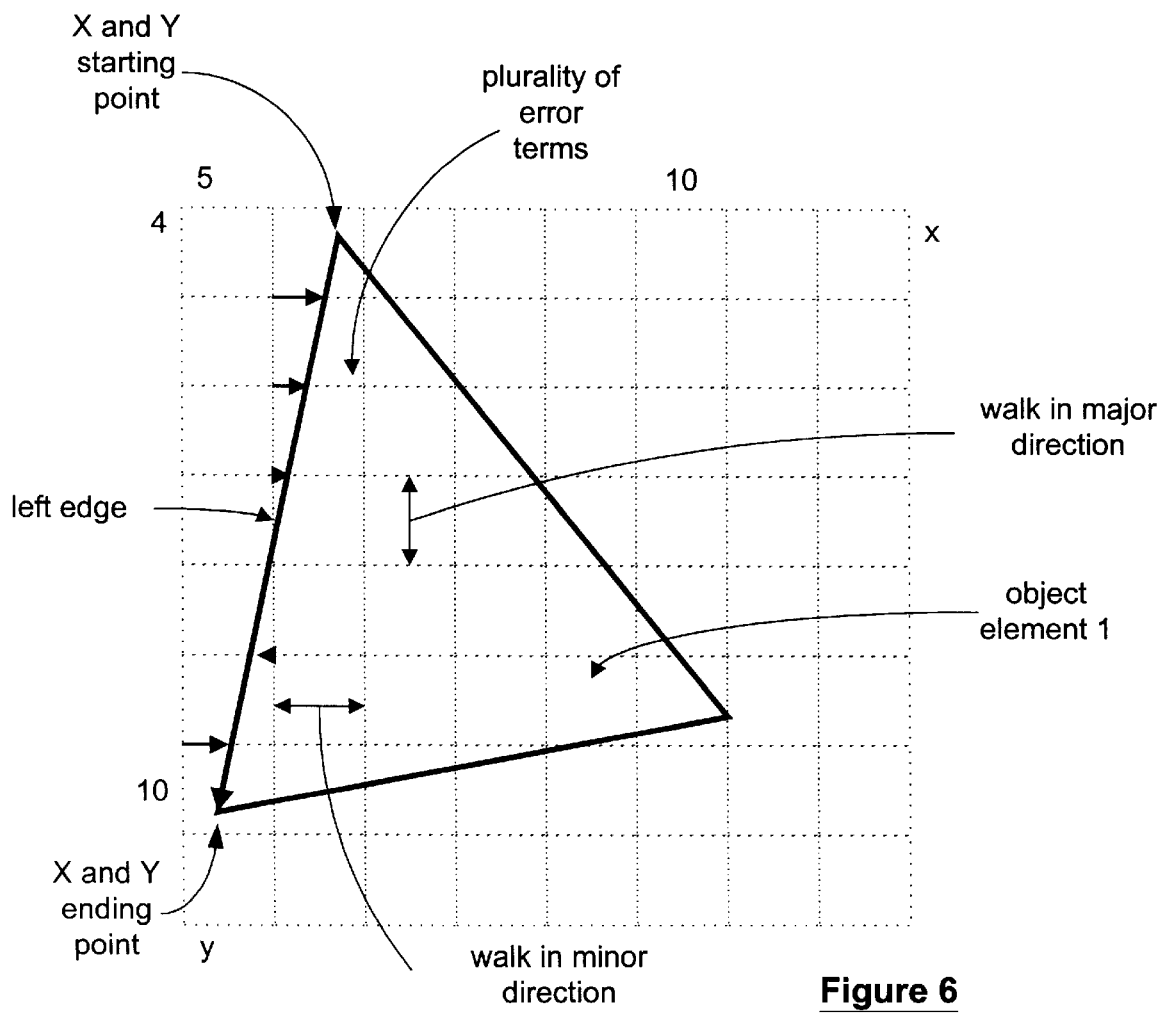
FIG. 6 illustrates walking an edge of an object-element in accordance with the present invention.

FIG. 6 illustrates the walking of object-element 1's left edge. As the edge is walked a corresponding error term is generated. The first error term, i.e., the initial error term, is shown at pixel location (6, 4. To calculate this error term, the X and Y starting point, which is of subpixel precision, the decision corner, the slope is used to calculate the error term. Refer back to the discussion of FIG. 3 for an example of calculating the initial error terra Once the initial error term is calculated, subsequent error terms are readily ascertainable from the minor component of the slope. For example if the slope is an Y major slope (i.e., $\Delta y$ is greater (x), the minor component of the slope is $\Delta x$.

To determine the error term at pixel location (6, 5), which is the next pixel along the left edge, the minor component of the slope (in this example (x)) is added to the initial error term If the slope is less than a threshold value (E.g. 0 for this example), the walking continues along the major axis (in this example, along the Y-axis). To determine the error term at pixel location (6, 6), which is the next pixel along the left edge, the minor component of the slope is added to the error term of pixel (6,5). As shown, the error term at (6, 6) is still less than one pixel so the edgewalker circuit walks the left edge along the major direction. Walking in the major direction continues as long as the error term remains below the threshold. Once the error term exceeds the threshold, which it does at pixel location (6,8), the walking of the edge switches to walking in the minor direction Having walked once in the minor direction, the waling of the edge continues in the major direction. Note that walking of an edge may occur multiple times in the major direction but will occur only once in the minor direction. Further note that the error term is a relative term and may be established with any relationship to the decision corner.

Figure 7:
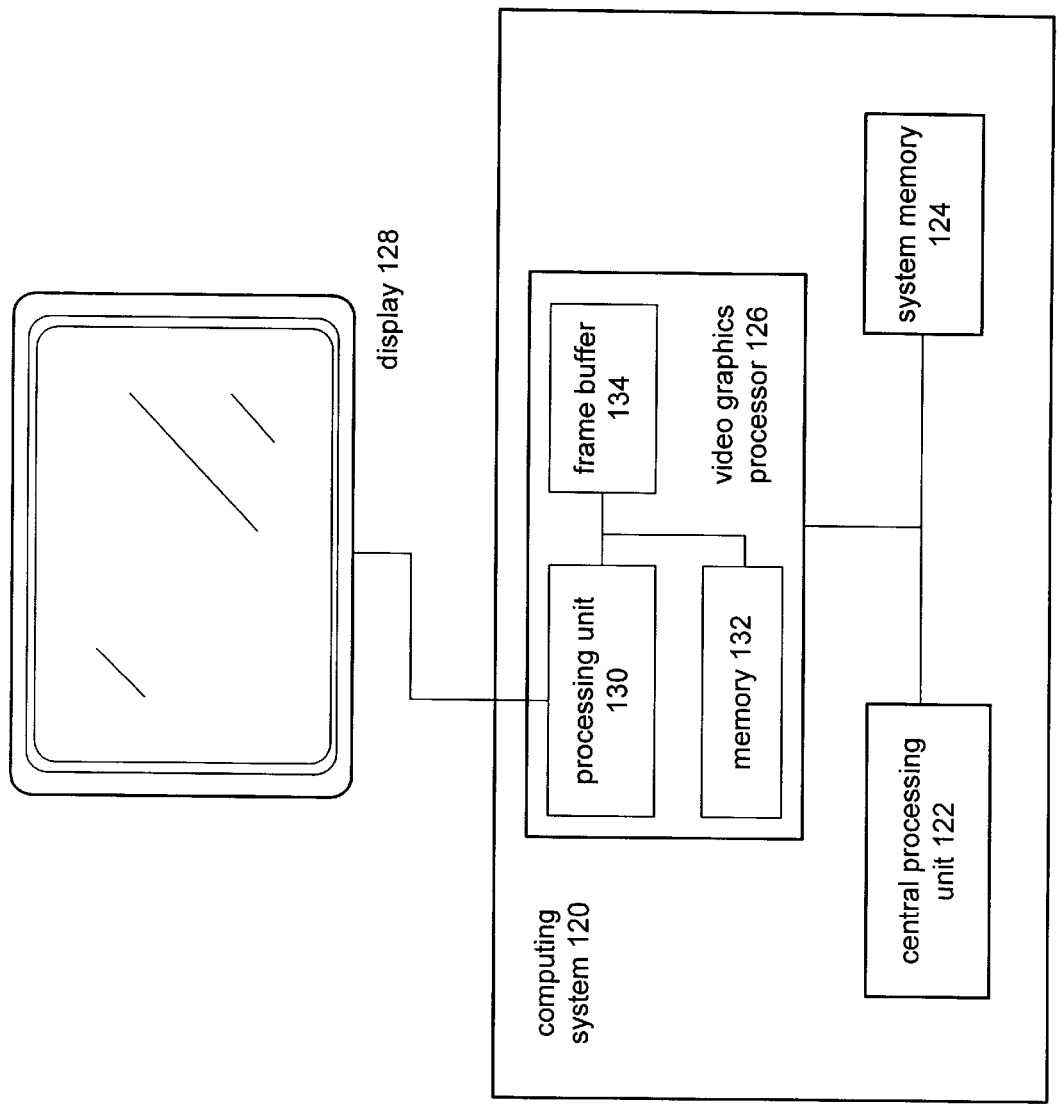
FIG. 7 illustrates a schematic block diagram of a computing system that is in accordance with the present invention.

FIG. 7 illustrates a schematic block diagram of a computing system 120 that includes a video graphics processor 126, a central processing unit 122, system memory 124, and a display 128. The central processing unit 122 may be any type of processing device such as a microprocessor, a microcontroller, a microcomputer, a digital signal processor, or any other device that manipulates digital information based on programming instructions. The system memory 124 may be read-only memory, random access memory, floppy disk memory, hard disk memory, CD-ROM, DVD ROM, magnetic tape, or any other means for storing digital information.

The video graphics processor 126 includes a processing unit 130, a frame buffer 134, and memory 132. The memory 132, which may be a random access memory, read-only memory, magnetic tape, hard disk memory, floppy disk memory, CD ROM DVD ROM, or any other means for storing digital information, stores programming instructions. The programming instructions, when read by the processing unit 130 causes the processing unit 130 to execute the methods illustrated in FIGS. 8 through 17. The processing unit 130 may be a microprocessor, a micro-controller, a digital signal processor, or any other device that manipulates digital information based on programming instructions. The frame buffer 134 may be RAM that stores pixel information that is subsequently displayed on display 28.

The methods illustrated in FIGS. 8 through 17 may be executed by the processing unit 130, the CPU 122, or the combination of the CPU 122 and the processing unit 130.

Figure 8:
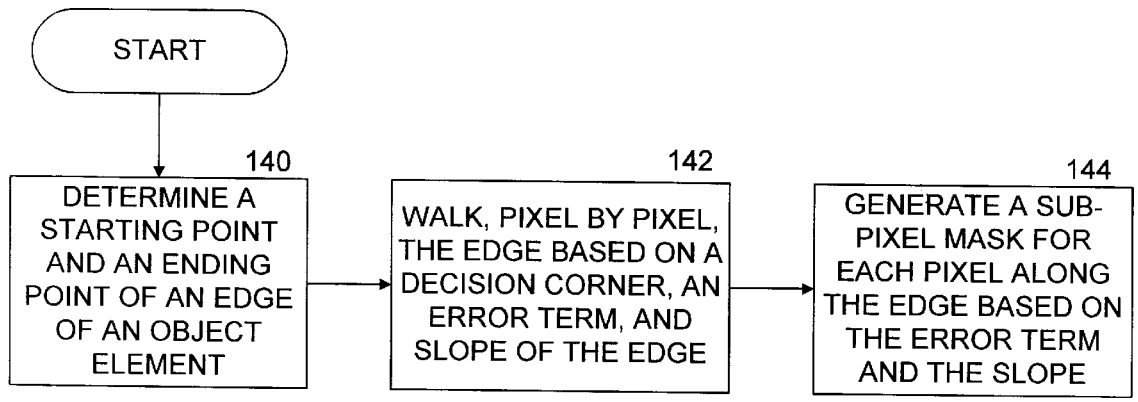
FIG. 8 illustrates a logic dram for generating subpixel masks in accordance with the present invention.

FIG. 8 illustrates a logic diagram for generating subpixel masks in accordance with the present invention. The process begins at step 140 where a starting point and an ending point of an edge of an object-element are determined. Recall from FIG. 6 that the starting point is the X and Y starting point and the ending point is the X and Y ending point of the edge.

Once the edge is identified, the process proceeds to step 142 where the edge is walked, pixel by pixel based on a decision corner, an error term, and the slope of the edge. This was discussed with reference to FIGS. 3 and 6. The process then proceeds to step 144 where a subpixel mask for each pixel along the edge is generated based on the error term and the slope. As discussed with reference to FIGS. 3 and 4, the error term and the slope identify a particular subpixel sequence which, based on the subpixel sequence, establishes the coverage area of a pixel by the object element. The coverage area of the particular object-element is then used to generate the subpixel mask.

Figure 9:
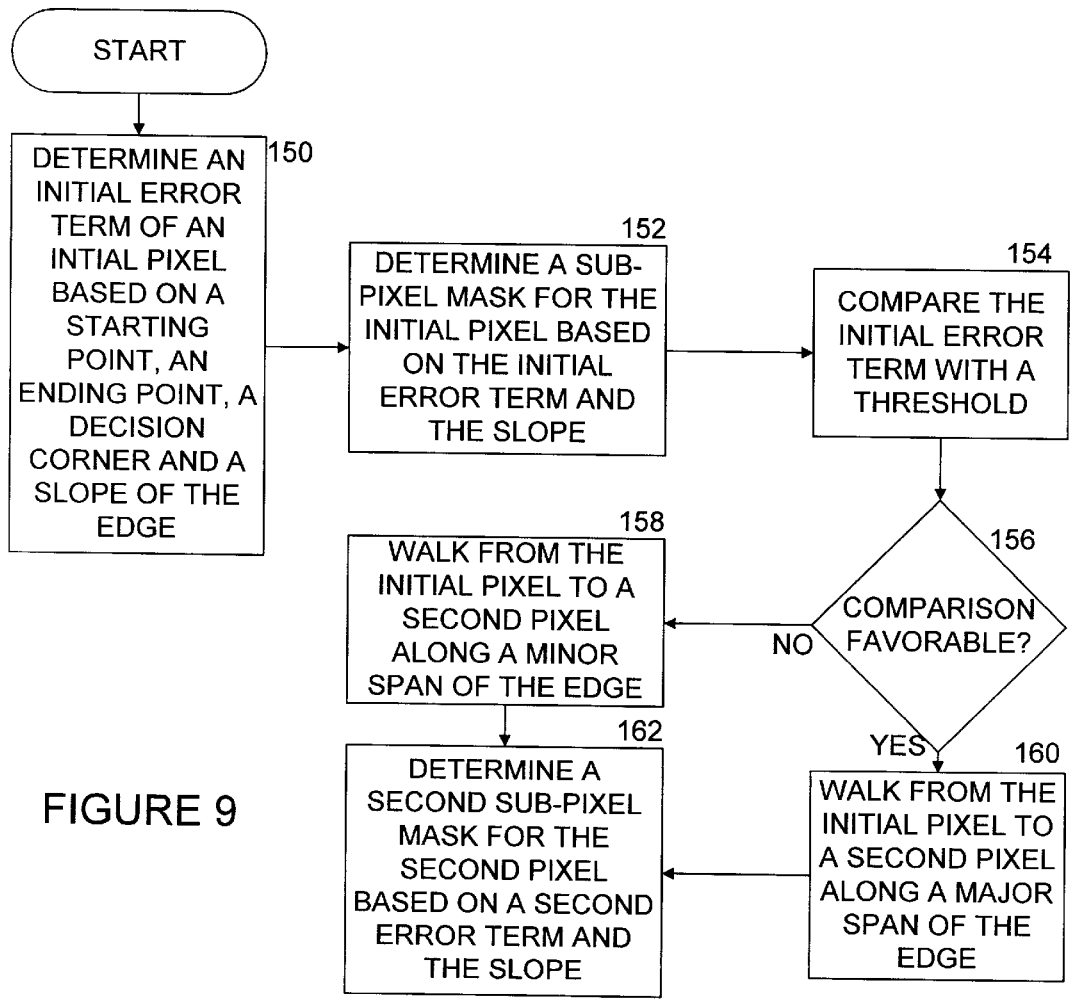
FIG. 9 illustrates a logic diagram for an alternate method of generating subpixel masks in accordance with the present invention.

FIG. 9 illustrates an alternate method for generating subpixel masks. The process begins at step 150 where an initial error term of an initial pixel is determined based on a starting point, an ending point, a decision corner, and the slope of the edge. This was discussed and illustrated in FIGS. 3 and 6. The process then proceeds to step 152 where a subpixel mask for the initial pixel is determined based on the initial error term and the slope. The process then proceeds to step 154 where the initial error term is compared with the threshold.

The process then proceeds to step 156 where a determination is made as to whether the comparison was favorable. If yes, the process proceeds to step 160 where the edgewalker circuit walks from the initial pixel to a second pixel along a major span of the edge. Recall that the major span of the edge is based on whether the changes in the X direction are greater than the changes in the Y direction. When the changes in the X direction are greater than the changes in the Y direction, the slope is of an X major span. Conversely, when the changes are in the Y direction are greater than the changes in the X direction, the slope is of a Y major span. The process then proceeds to step 162 where a second subpixel mask is determined for the second pixel based on a second error term and the slope.

If the comparison of step 156 was not favorable, the process proceeds to step 158. At step 158, the edgewalker circuit walks from the initial pixel to the second pixel along a minor span of the edge. Having walked to the second pixel, the process proceeds to step 162 where a second subpixel mask for the second pixel is determined based on the second error term and the slope. The second error term may be generated by incrementing the initial error term by the slope when the initial term compared favorably to the threshold. Alternatively, the second error term may be generated by decrementing the initial error term by a constant when the initial error term compared unfavorably to the threshold.

As illustrated in FIG. 6, when the error term changed from the initial pixel to the second pixel the change was in the major direction such that the error term was incremented by the slope. Once the error term exceeded the threshold (i.e., became less than 0), the error term for the next pixel was decremented by a constant value (i.e., one pixel).

Figure 10:
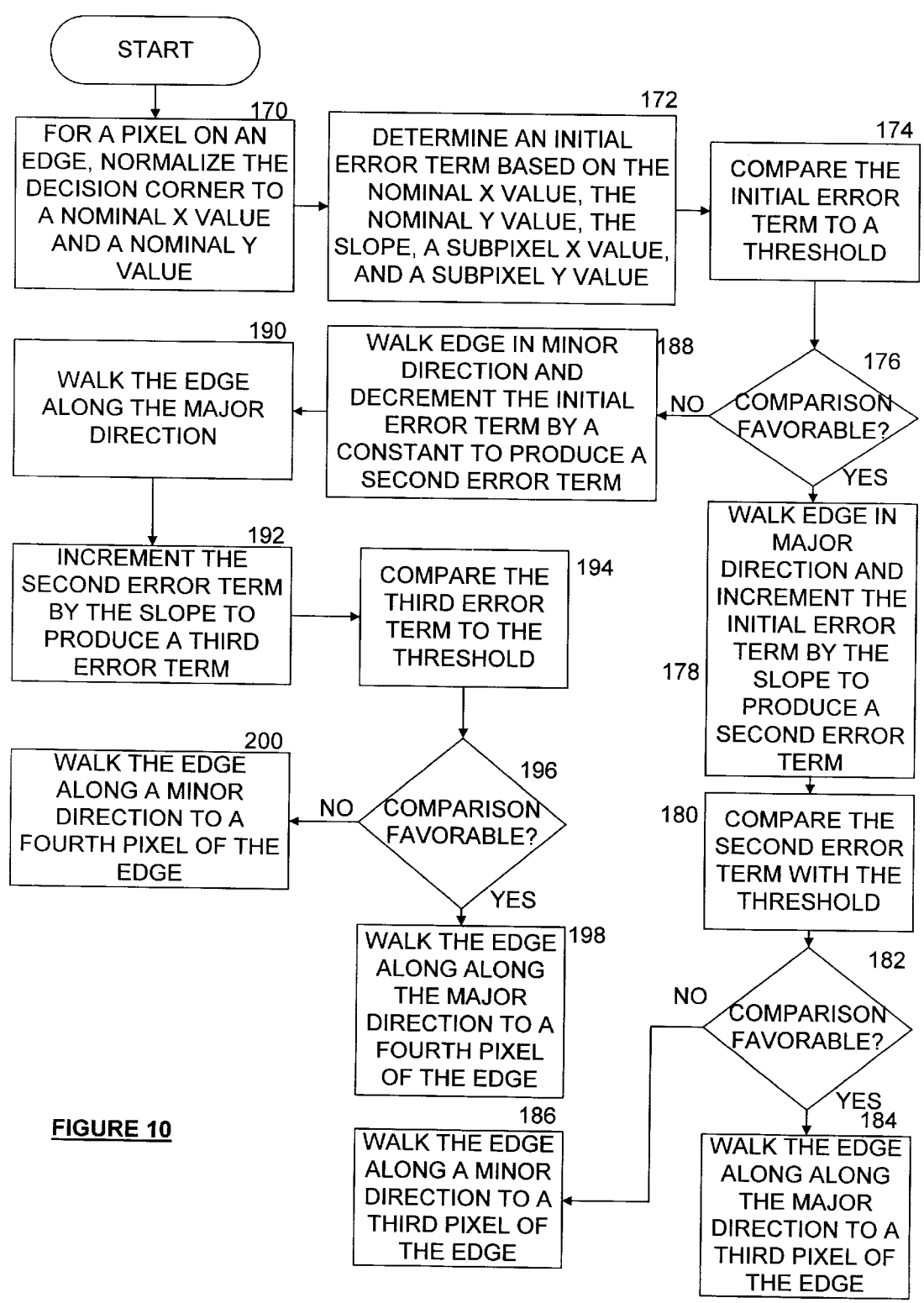
FIG. 10 illustrates a logic diagram of a method for walking the edges of an object-element in accordance with the present invention.

FIG. 10 illustrates a logic diagram that may be implemented by the edgewalker circuits to walk an edge of an object-element. The process begins at step 170 where, for a pixel of an edge, the decision corner is normalized to a nominal X value and a nominal Y value. As shown in FIG. 4, by placing the decision corner at one of the four corners of the pixel, the error term can be calculated. From the error term and the slope, the subpixel sequence can be calculated as previously described.

The process proceeds to step 172 where an initial error term is determined based on the nominal X value, the nominal Y value, the slope, a subpixel X value, and a subpixel Y value. This has been discussed with reference to FIG. 6. Note that orientating an edge of the object-element has normalized the slope such that the slope remains in a ratio of the minor span to the major span to be in the range of 0 to 1. FIG. 4 illustrates the normalizing of the orientation of the edge to maintain the slope ratio between the minor span and the major span to be between a range of 0 to 1.

The proceeds to step 174 where the initial error term is compared to a threshold. The process then proceeds to step 176 where a determination is made as to whether the comparison was favorable. If yes, the process proceeds to step 178 where an edgewalker circuit walks an edge in the major direction and increments the initial error term by the slope to produce a second error term.

The process then proceeds to step 180 where a comparison is made between the second error term and the threshold. At step 182 a determination is made as to whether the comparison was favorable. If yes, the process proceeds to step 184 where the edgewalker circuit walks the edge along the major direction to a third pixel of the edge. It however, the comparison in step 182 was not favorable the process proceeds to step 186. At step 186, the edgewalker circuit walks the edge along a minor direction to a third pixel of the edge.

If the comparison of the initial error term to the threshold was unfavorable, the process proceeds to step 188 where the edgewalker circuit walks the edge in a minor direction and decrements an initial error term by a constant to produce a second error term. The process then proceeds to step 190 where the edgewalker circuit walks the edge along the major direction to a third pixel. The process then proceeds to step 192 where the second error term is incremented by the slope to produce a third error term. The process then proceeds to step 194 where the third error term is compared to the threshold. If the comparison of the third error term of the threshold is favorable, the process proceeds to step 198. At step 198, the edgewalker circuit walks along the major direction to a fourth pixel of the edge. If, however, the comparison at step 196 is not favorable, the process proceeds to step 200 where the edgewalker circuit walks the edge along a minor direction to a fourth pixel of the edge.

Figure 11:
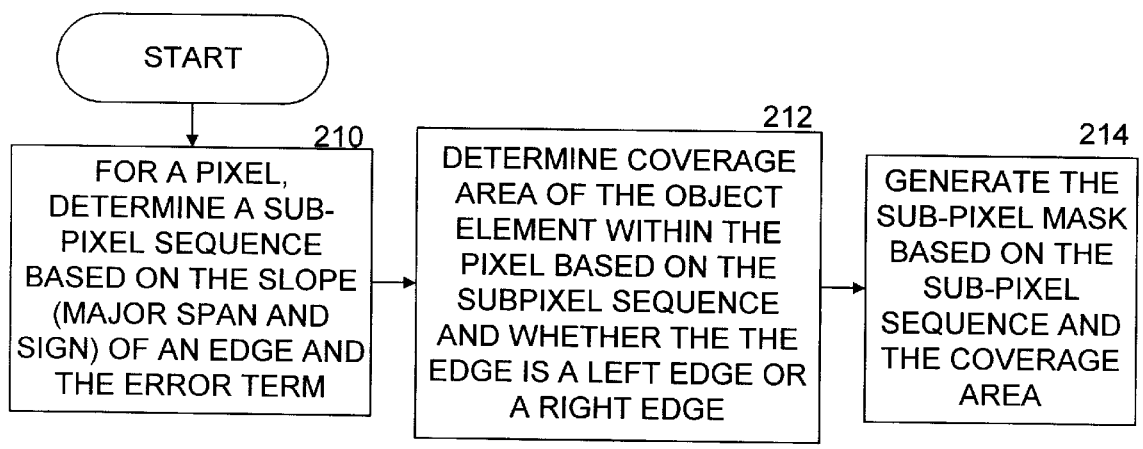
FIG. 11 illustrates a logic diagram of another method for generating subpixel masks in accordance with the present invention.

FIG. 11 illustrates a logic diagram of an alternate method for generating subpixel masks. The process begins at step 210 where, for a pixel a subpixel sequence is determined based on the slope, (i.e., the major span and sign) of an edge and the error term This was discussed and illustrated with reference to FIG. 4. The process then proceeds to step 212 where coverage area of the object-element within the pixel is determined based on the subpixel sequence and whether the edge is a left edge or a right edge. This was discussed with reference to FIGS. 3 through 5. The process then proceeds to step 214 where the subpixel mask is generated based on the subpixel sequence and the coverage area Note that for a given pixel, a plurality of object-elements may partially cover the pixel thus the process of FIG. 11 would be repeated for each object-element having partial coverage of the pixel.

Figure 12:
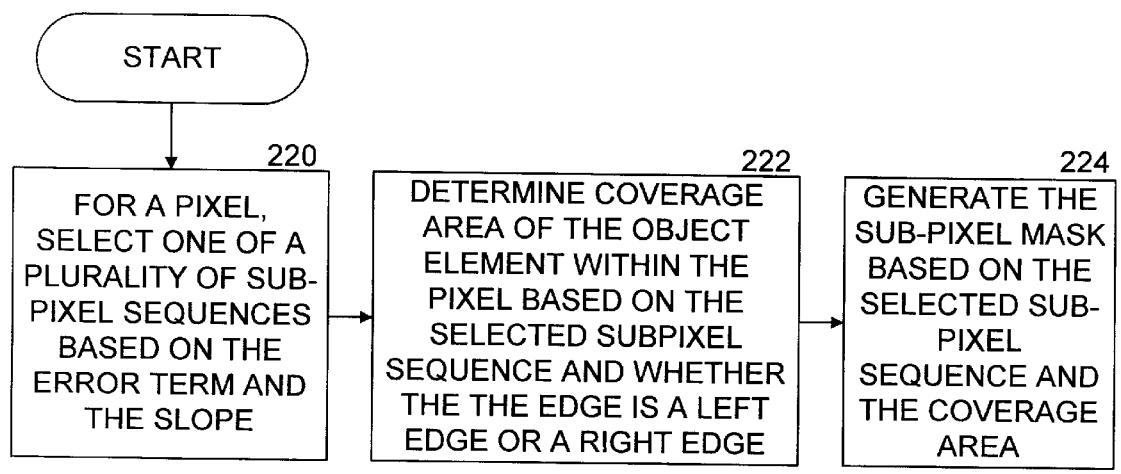
FIG. 12 illustrates a logic diagram of yet another method for generating subpixel masks in accordance with the present invention.
Figure 13:
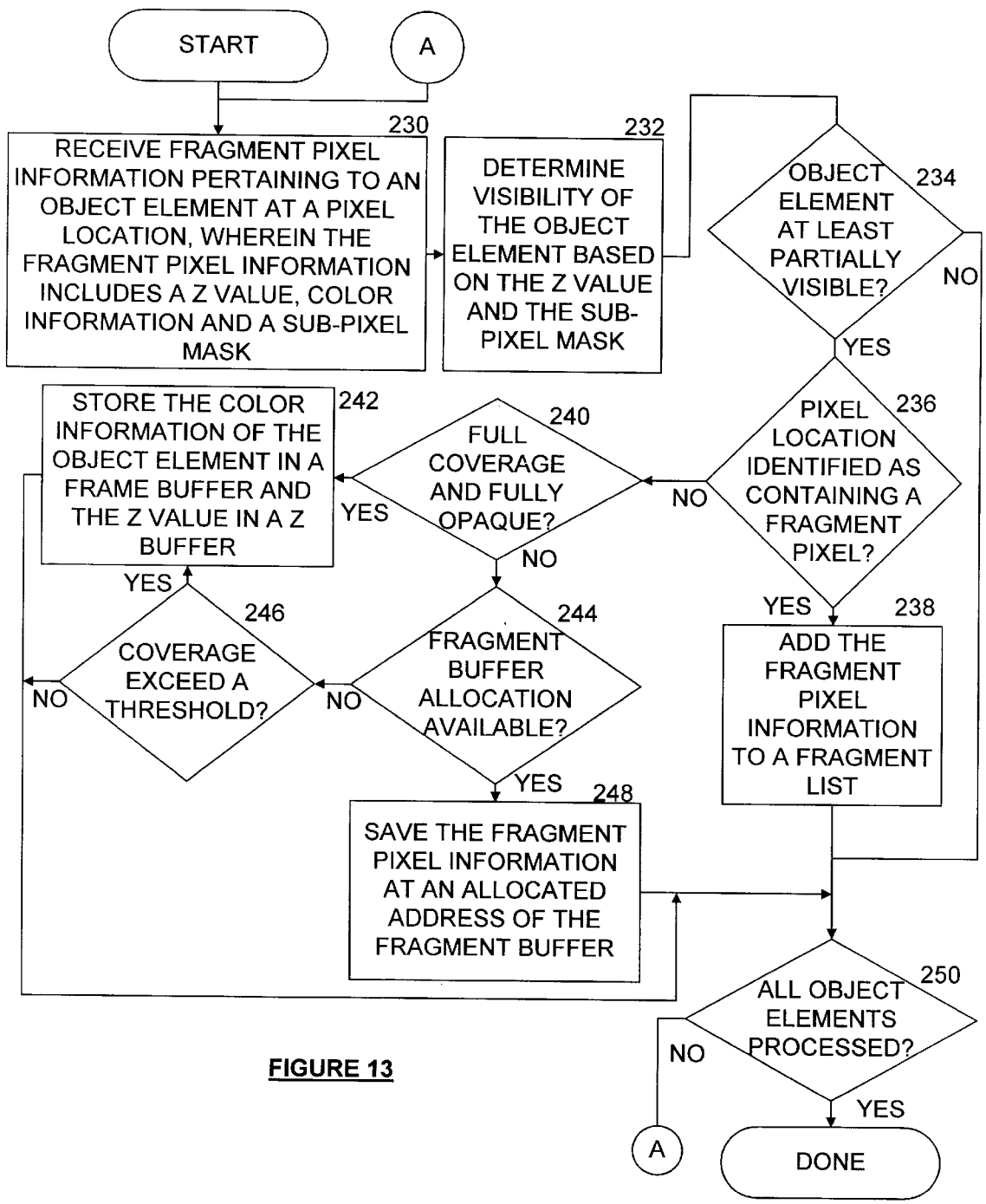
FIG. 13 illustrates a logic diagram for a method for generating fragment pixel information in accordance with the present invention.

FIG. 12 illustrates a logic diagram for yet another alternate method for generating subpixel masks. The process begins at step 220 where, for a pixel one of a plurality of subpixels is selected based on the error term and the slope. Accessing a look-up table such as the one shown in FIG. 4 to retrieve a particular subpixel sequence may do the selection. The process proceeds to step 222 where the coverage area of the pixel by an object-element is determined based on the selected subpixel sequence and whether the edge is a left edge or a right edge. The process then proceeds to step 224 where the subpixel mask is generated based on the selected subpixel sequence and the coverage area FIG. 13 illustrates a logic diagram for a method of generating fragmented pixel information. The process begins at step 230 where fragment pixel information pertaining to an object-element at a pixel location is received. The fragment pixel information includes a Z value, color information, and a subpixel mask. The process then process to step 232 where visibility of the object-element is determined based on the Z value and the subpixel mask. The process then proceeds to step 234 where a determination is made as to whether the object-element is at least partially visible.

If the object-element is at least partially visible, the process proceeds to step 236, where another determination is made as to whether the pixel location has been identified as containing a fragment pixel. If yes, the process proceeds to step 238 where the fragment pixel information is added to the fragment pixel list. Adding fragment pixel information to the fragment list will be discussed in greater detail with reference to FIG. 15.

Once the fragment pixel information has been added to the fragment list, the process proceeds to step 250 where a determination is made as to whether all object-elements have been processed. If all the object-elements have been processed for this particular pixel location, the generation of fragment pixel information is complete. If, however, all of the object-elements for this particular pixel location have not been processed, the process proceeds at step 230.

If the object-element was not at least partially visible, the process proceeds to step 250 where a determination is made as to whether all object-elements have been processed. If the pixel location has not been identified as containing a fragment pixel, the process proceeds to step 240 where a determination is made as to whether the current object-element has full coverage and is fully opaque. If yes, the process proceeds to step 242 where the color information of the object-element is stored in the frame buffer and the Z value is stored in a Z buffer. Having done this, the process repeats at step 250.

If; however, the current object-element does not have full coverage or is not fully opaque, the process proceeds to step 244. At step 244 a determination is made as to whether fragment buffer allocation is available. In other words, step 244 is determining whether there is available space within the fragment buffer. If yes, the process proceeds to step 248 where the fragment pixel information of the current object-element is saved in an allocated address of the fragment buffer. Having done this, the process repeats at step 250. If; however, fragment buffer allocation is not available, the process proceeds to step 246. At step 246, a determination is made as to whether the current object-element coverage of the pixel exceeds a threshold. For example, the threshold may be set in the range of fifty percent (50%) to one-hundred percent (100%). If the coverage area of the current object-element exceeds the threshold, the process proceeds to step 242. If, however, the coverage area does not exceed the threshold, the fragment information relating to this object-element is dropped and the process repeats at step 250.

Figure 14:
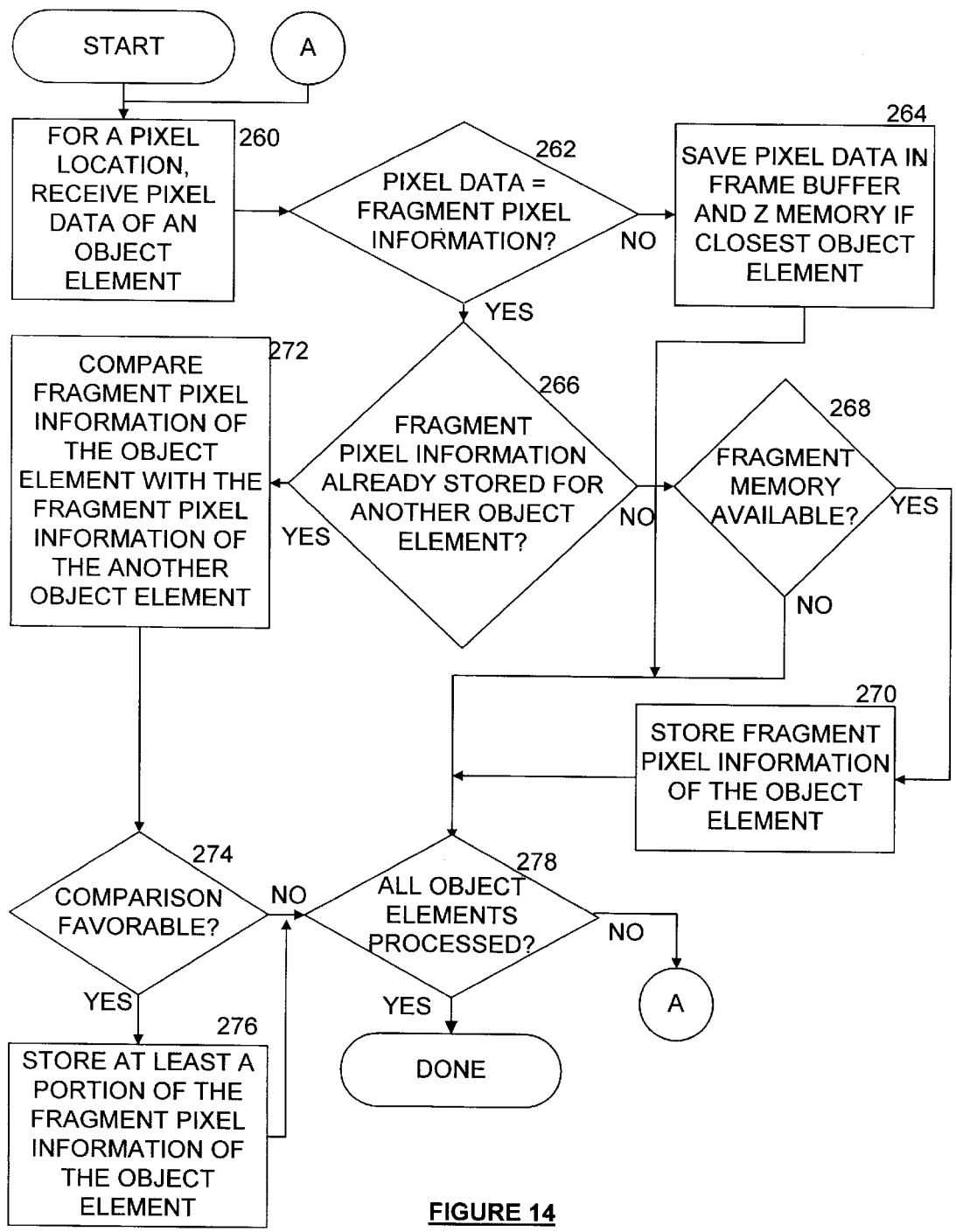
FIG. 14 illustrates a logic diagram of another method for generating fragment pixel information in accordance with the present invention.

FIG. 14 illustrates a logic diagram for a method of processing fragment pixel information which further expands on, and/or complements, the process of FIG. 13. The process begins at step 260 where, for a pixel location, pixel data of an object-element is received. Recall from FIG. 1 that pixel data includes subpixel masks, color value, and a Z value. The process then proceeds to step 262 where a determination is made as to whether the pixel data is equivalent to pixel information. For the purposes of this discussion, fragment pixel information is pixel data that includes the subpixel masks, a color value, and a Z value for a pixel that is located on a edge of an object-element.

It the pixel data does not equal fragment pixel information, the process proceeds to step 264. At step 264, the color value of the pixel data is stored in the frame buffer while the Z value of the pixel value is stored in a Z buffer provided that the object-element is the closest object-element for this particular pixel. Having done this, the process proceeds to step 278, where a determination is made as to whether all object-elements have been processed at this particular pixel location. If not, the process proceeds at step 260. It however, all object-elements have been processed for this particular pixel location, the process is complete.

If, the pixel data is equivalent to the fragment pixel information, the process proceeds to step 266. At step 266, a determination is made as to whether fragment pixel information of another object-element is already stored. If not, the process proceeds to step 268 where a determination is made as to whether fragment memory, i.e., fragment buffer, is available. If not, the process proceeds to step 278. If, however, fragment memory is available, the process proceeds to step 270. At step 270, fragment pixel information of the current object-element is stored. Having stored this information, the process proceeds to step 278.

If, however, fragment pixel information is already stored in the fragment buffer for another object-element, the process proceeds to step 272. At step 272, the fragment pixel information of the object-element is compared with the fragment pixel information of another object-element. Such a comparison may be done by comparing the subpixel mask of the current object element with the subpixel mask of another object-element to determine whether the fragment pixel information of the current object-element compares favorable to the fragment pixel information of another object-element. In other words, is there a portion of the subpixel mask of the current object-element that is not blocked by the subpixel mask of another object-element.

The process then proceeds to step 274 where a determination is made as to whether the comparison was favorable. The comparison may be favorable when the current object-element is closer than another object-element, or when at least a portion of the fragment pixel information of the object-element is not blocked by the fragment pixel information of another object-element. If the comparison was favorable, the process proceeds to step 276 where at least a portion of the fragment pixel information of the current object-element is stored in the fragment buffer. If the comparison was unfavorable, the process proceeds to step 278.

Figure 15:
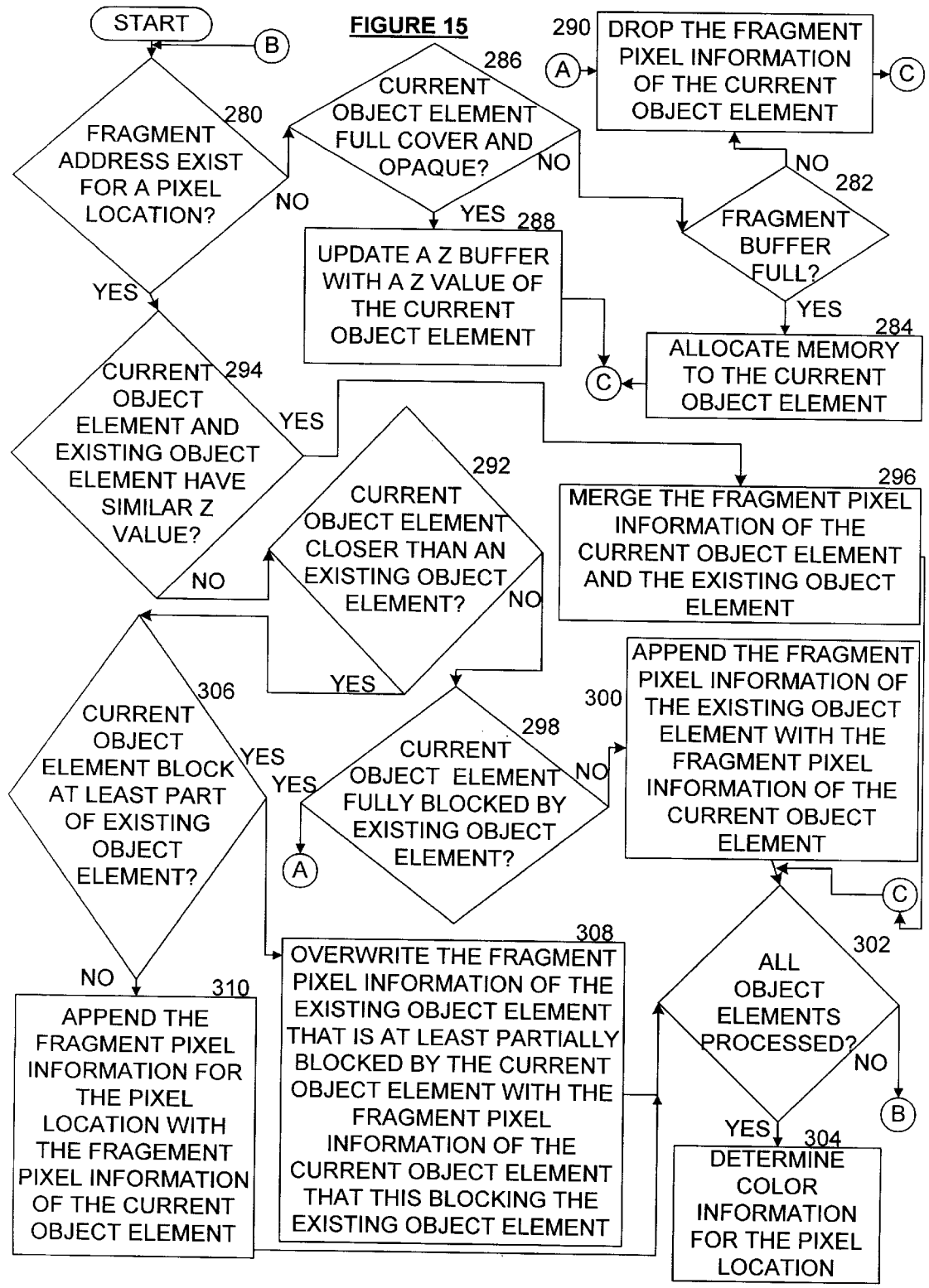
FIG. 15 illustrates a logic diagram of a method for generating color information in accordance with the present invention.

FIG. 15 illustrates a logic diagram for a method of adding fragment pixel information to the fragment buffer. The process begins at step 280 where a determination is made as to whether, within the fragment buffer, a fragment address exists for a given pixel location. If yes, the process proceeds to step 294 where a determination is made as to whether the current object-element and the existing object-element have a similar Z value. Recall from FIG. 3 that when a vertex is located within a pixel two edges are walked and error terms are created for each edge. In operation, each of the edges is treated as separate object-elements. Thus, the query at step 294 is asking whether the particular current object-element is just another edge of an object-element that has already been processed.

If the current object element and the existing object element do not have similar z values, the process proceeds to step 292. At step 292 a determination is made as to whether the current object element is closer than an existing object-element, wherein the existing object-element is an object element that has fragment pixel information already stored at the fragment address. If the current object-element is closer, the process proceeds to step 306 where a determination is made as to whether the current object-element blocks the existing object-element. Typically this query will be whether the current object-element completely blocks the existing object-element for most application, but for finer granularity applications, the test will be for at least partial blocking.

If the current object-element blocks at least a part of the existing object-element, the process proceeds to step 308. At step 308, the fragment pixel information of the existing object-element that is at least partially blocked by the current object-element is overwritten with the fragment pixel information of the current object-element that is blocking the existing object-element. Having done this, the process proceeds to step 302 where a determination is made as to whether all object-elements that are within this particular pixel location have been processed If not, the process repeats at step 280. If, however, all object-elements have been processed, the process proceeds to step 304 where, based on the fragment pixel information, color information for the particular pixel location is determined. The resulting pixel information is then provided to the frame buffer for subsequent display.

If a fragment address does not exist for this particular location as determined at step 280, the process proceeds to step 286. At step 286, a determination is made as to whether the current object element fully covers the pixel and whether the object is fully opaque. If yes, the process to step 288 where the pixel information and the z information of the current object are stored in the frame buffer and z buffer, respectively. If, however, the current object element does not fully covers the pixel or the object is not fully opaque, the process proceeds to step 282. At step 282, a determination is made as to whether the fragment buffer is full. If yes, the process proceeds to step 290 where the fragment pixel information of the current object-element is dropped. Having done this, the process proceeds to step 302. If, however, the fragment buffer is not full the process proceeds to step 284, where memory is allocated to the current object-element for storing its corresponding fragment pixel information. Having done this, the process proceeds to step 302 where the determination is made as to whether all object-elements have been processed, which has been previously discussed.

If the current object-element and the existing object-element have similar Z values as determined at step 294, the process proceeds to step 296. At step 296, the fragment pixel information of the current object-element is merged with the fragment pixel information of the existing object-element. Having done this, the process proceeds to step 302, which has been previously discussed.

If the current object-element is not closer than the existing object-element as determined at step 292, the process proceeds to step 298. At step 298, a determination is made as to whether the current object-element is fully blocked by the existing object-element. If yes, the process proceeds to step 290 where the information of the current object-element is dropped. If, however, the current object-element is not fully blocked, the process proceeds to step 300. At step 300, the fragment pixel information of the existing object-element is appended with the fragment pixel information of the current object-element. This was illustrated and discussed with reference to FIGS. 3 through 5. Having appended the fragment pixel information, the process proceeds to step 302.

If the current object-element is not blocking at least a part of the existing object-element, the process proceeds to step 310. At step 310, the fragment pixel information for the pixel location is appended with the fragment pixel information of the current object-element. Having done this, the process proceeds to step 302.

Figure 16:
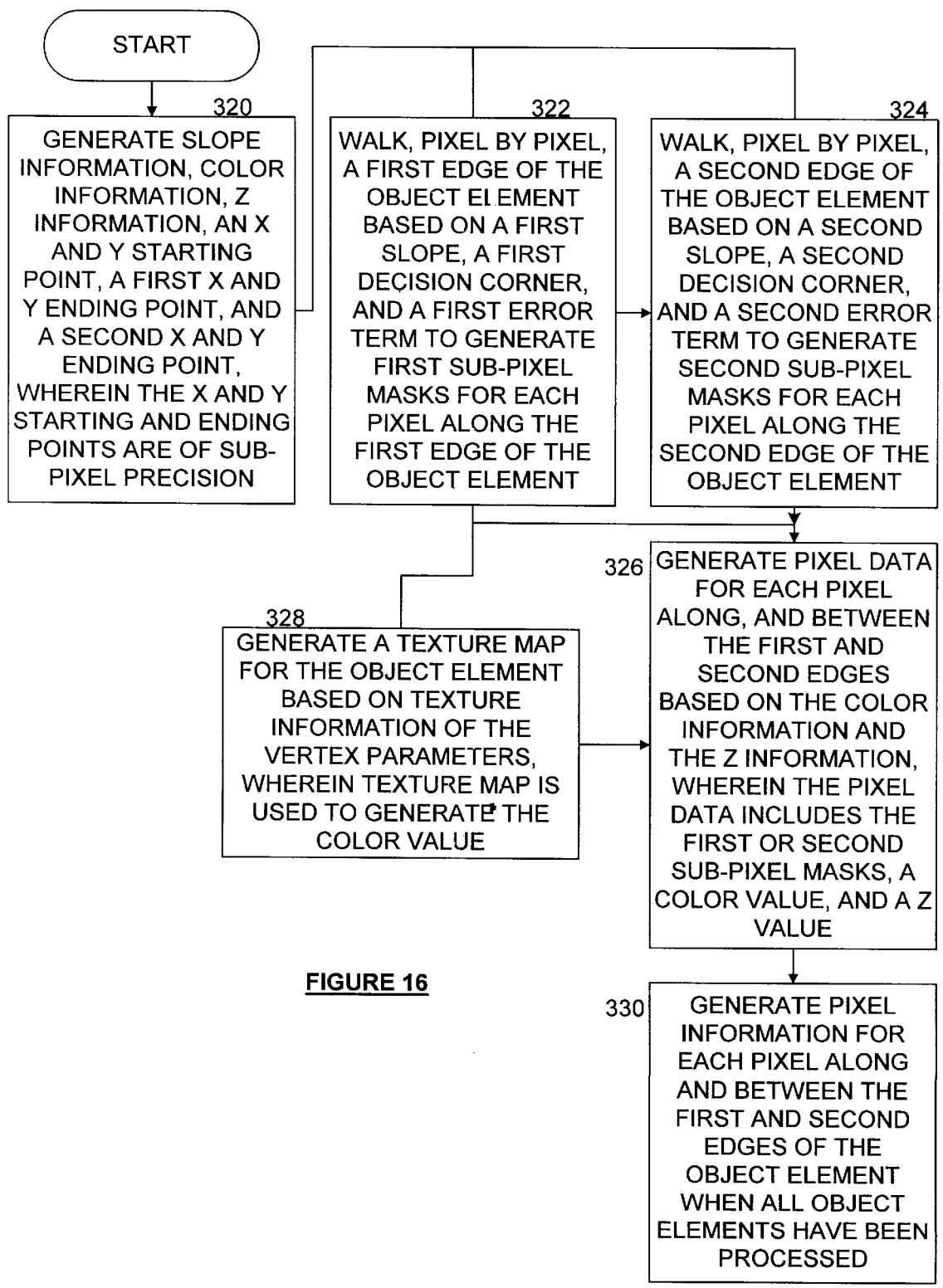
FIG. 16 illustrates a logic diagram of a method for generating pixel information in accordance with the present invention.

FIG. 16 illustrates a logic diagram for a method of generating pixel information based on subpixel masks generated in accordance with the preceding discussion. The process begins at step 320 where slope information, color information, Z information, an X and Y starting point, a first X and Y ending point, and a second X and Y ending point are generated from vertex parameters. The X and Y starting point and the X and Y ending points are of subpixel precision. In addition to generating this information, the process may cause the processing unit to further generate a texture map for the object-element based on texture information of the vertex parameters. If this is the case, the color value generated by the span engine will be based on the texture map.

The process then proceeds to step 322 where an edgewalker circuit walks, pixel by pixel a first edge of the object-element based on a first slope, a first decision corner, and a first error term. In addition to walking the first edge in this manner, the edgewalker circuit facilitates the generation of a first subpixel mask for each pixel along the first edge of the object-element. Establishing the pixel coverage information by accessing a look-up table, where the look-up table includes a plurality of subpixel sequences, may do the generation of the subpixel mask. To access the look-up table, the address is derived from the first slope and the first error term for each pixel along the first edge.

While the first edgewalker circuit is walking the first edge as described in step 322, the second edgewalker circuit is walking the second edge as discussed in step 324. At step 324, the second edgewalker circuit walks, pixel by pixel the second edge of the object-element based on a second slope, a second decision corner, and a second error term. In addition to walking the second edge, the second edgewalker circuit facilitates the generation of second subpixel masks for each pixel along the second edge of the object-element.

Having done this, the process proceeds in parallel to step 326 and 328. Note that step 328 is an optional step and is included only when texture information for the particular object is included in the vertex parameters. As such, at step 328, a texture map is generated for the object-element based on texture information contained within the vertex parameters. The texture map is used to generate the color value as previously discussed. At step 326 pixel data for each pixel, along, and between, the first and second edges is generated based on the color information and the Z information (and the texture map). The pixel data includes the first or second subpixel mask, a color value, and a Z value, for pixels along the first and second edges and includes the color value and the Z value for pixels between the first and second edges.

Having done this, the process proceeds to step 330 where pixel information for each pixel along and between the first and second edges is generated when all object-elements have been processed. To produce the pixel information for each pixel, on and between the edges, the pixel information for these pixels is based on the color value of a visible object-element, where the visible object-element is determined based on the Z value of the respective object-elements. Further, the pixel information for these pixels is based on fragment pixel information of the respective object-elements. This was discussed with reference to FIGS. 3 through 6 above. The fragment pixel information used to calculate the pixel information is based on the subpixel masks.

Figure 17:
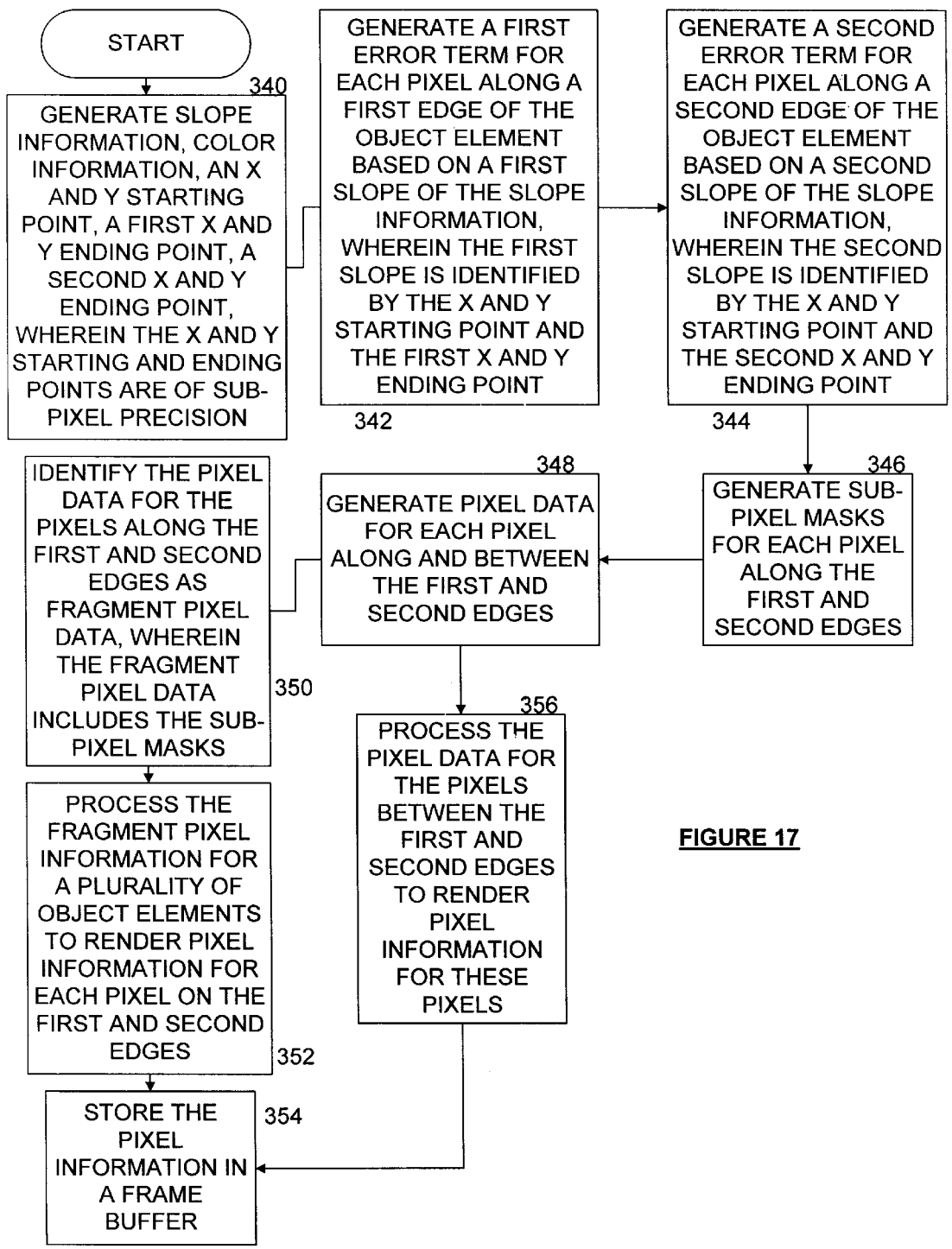
FIG. 17 illustrates a logic diagram of an alternate method for generating pixel information in accordance with the present invention.

FIG. 17 illustrates a logic diagram for generating pixel information in an alternate manner. The process begins at step 340 where slope information, color information, an X and Y starting point, a first X and Y ending point, a second X and Y ending point, are generated from vertex parameters. The X and Y starting points and the X and Y ending points are of subpixel precision. The process then proceeds to step 342 where a first error term for each pixel along the first edge of the object-element is generated based on a first slope of the slope information. The X and Y starting point and the first X and Y ending point identify the first slope.

The process then proceeds to step 344 where a second error term for each pixel along a second edge of the object-element is generated based on a second slope of the slope information. The second slope is identified by the X and Y starting point and the second X and Y ending point. The process then proceeds to step 346 where subpixel masks are generated for each pixel along the first and second edges.

The process then proceeds to step 348 where pixel data for each pixel along and between the first and second edges are generated. Having done this, the process proceeds to step 350 where the pixel data for the pixels along the first and second edges are identified as fragment pixel data The fragment pixel data includes the subpixel mask, the color value, and the Z value. Once this is done, the process proceeds to step 352 where the fragment pixel information for a plurality of object-elements is processed to render pixel information for each pixel on the first and second edges. The processing of the fragment pixel information is done based on a processing order, which is based on the Z value of each of the plurality of object-elements. In other words, object-elements that are closer receive preferential processing than objects that are further away.

Once the pixel information has been generated, it is stored in the frame buffer as depicted by step 354. For pixel data that does not include the subpixel masks, the process proceeds to step 356. At step 356, the pixel data for pixels between the first and second edges are processed to render pixel information for these pixels. Having done this, this pixel information is stored as described in step 354.

The preceding discussion has presented a method and apparatus for a video graphics processor to include, in a commercially viable manner, anti-aliasing. Anti-aliasing is achieved by calculating an error term based on a decision corner wherein the error term and the slope of an edge being walked, are used to identify a particular subpixel sequence. The selected subpixel sequence is used to determine the coverage area of the pixel. Based on perspective coverage areas of a pixel, the color information of various object-elements is processed to produce pixel information for the given pixel. By normalizing the subpixel sequences, the memory requirements are substantially reduced, thereby making the video graphics processor more commercially viable.

What is claimed is:

1. A method for processing fragment pixel information, the method comprises the steps of:
    a) generating a sub-pixel mask for an object element at a pixel location based on a decision corner that is determined by starting at the pixel center, traveling in the major direction to the pixel edge and then on the minor direction to the pixel corner, an error term that is determined from the slope of the triangle edge and said decision corner, slope of an edge of the object element, and whether the edge is a left edge or a right edge;
    b) receiving fragment pixel information pertaining to the object element at the pixel location, wherein the fragment pixel information includes a z value, color information, and the sub-pixel mask;
    c) determining visibility of the object element at the pixel location based on the z value and the sub-pixel mask;
    d) when the object element is at least partially visible, determining whether the pixel location has been identified as containing a fragment pixel;
    e) when the pixel location has not been identified as containing the fragment pixel, determining whether the object element, at the pixel location, has full coverage and is opaque based on the sub-pixel mask and the color information; and
    f) when the object element has full coverage, is opaque, and is fully visible, storing the color information in a frame buffer and the z value in a z buffer.

2. The method of claim 1 further comprises,
    adding the fragment pixel information of the object element to a fragment list when the pixel location has been identified as containing the fragment pixel.

3. The method of claim 2 further comprises:
    determining whether the object element is closer than an existing object element corresponding to the fragment pixel information of the existing object element stored in the fragment list;
    when the object element is closer than the existing object element, determining whether the object element blocks visibility of the existing object element based on the sub-pixel masks of the existing object element and the object element; and
    when the object element blocks the visibility of at least a portion of the existing object element, overwriting the fragment pixel information of the at least a portion of the existing object element with the fragment pixel information of the object element.

4. The method of claim 1 further comprises:
    determining whether fragment buffer allocation is available when the object element does not have full coverage or is not opaque;
    when fragment buffer allocation is available, saving the fragment pixel information of the object element at an allocated address of a fragment buffer.

5. The method of claim 4 further comprises:
    determining pixel coverage of the object element from the sub-pixel mask;
    when the pixel cover of the object element exceeds a coverage threshold, storing the color information in a frame buffer and the z value in a z buffer.

6. A method for processing pixel information, the method comprising the steps of:
    a) receiving, for a pixel location, pixel data of an object element;
    b) determining whether the pixel data is fragment pixel information, wherein the sub-pixel information includes a sub-pixel mask, wherein the sub-pixel mask is generated based on a decision corner that is determined by starting at the pixel center, traveling in the major direction to the pixel edge and then on the minor direction to the pixel corner, an error term that is determined from the slope of the triangle edge and said decision corner, slope of an edge of the object element, and whether the edge is a left edge or a right edge;
    c) when the pixel information is the fragment pixel information, determining whether fragment pixel information has been stored for another object element;
    d) when the fragment pixel information has been stored for the another object element, comparing the fragment pixel information of the object element with the fragment pixel information of the another object element; and
    e) when the fragment pixel information of the object element compares favorably to the fragment pixel information of the another object element, storing at least a portion of the fragment pixel information of the object element.

7. The method of claim 6 further comprises:
    when the fragment pixel information of another object element is not stored, determining whether fragment memory is available; and
    when the fragment memory is available, storing the fragment pixel information of the object element.

8. The method of claim 6 further comprises determining that the comparing is favorable when the at least a portion of the fragment pixel information of the object element is not blocked by the fragment pixel information of the another object element.

9. The method of claim 6 further comprises comparing the sub-pixel mask of the object element with a sub-pixel mask of the another object element to determine whether the fragment pixel information of the object element compares favorably to the fragment pixel information of the another object element.

10. The method of claim 6 further comprises determining that the comparing was favorable when the object element is closer than the another object element.

11. A method for adding a fragment pixel information to memory, the method comprises the steps of:

a) determining whether a fragment address exists for a pixel location;

b) when the fragment address exists, determining whether a current object element having fragment pixel information is closer than an existing object element having fragment pixel information stored at the fragment address, wherein the fragment pixel information includes a sub-pixel mask that is generated based on a decision corner that is determined by starting at the pixel center, traveling in the major direction to the pixel edge and then on the minor direction to the pixel corner, an error term that is determined from the slope of the triangle edge and said decision corner, slope of an edge of the object element, and whether the edge is a left edge or a right edge;

c) when the current object element is closer than the existing object element, determining whether the current object element at least partially blocks visibility of the existing object element based on the sub-pixel masks of the current object element and the existing object element; and d) when the current object element at least partially blocks the visibility of the existing object element, overwriting the fragment pixel information of the existing object element that is at least partially blocked by the current object element with the fragment pixel information of the current object element that is blocking the existing object element.

12. The method of claim 11 further comprises:

when the fragment address does not exist and fragment memory is full, determining whether the current object element is fully opaque and fully covers the pixel location;

when the current object element is fully opaque and fully covers the pixel location, updating a z buffer with a z value of the current object element, and when the fragment pixel is not fully opaque or does not fully covers the pixel location, dropping the fragment pixel information of the current object element.

13. The method of claim 11 further comprises, within step (b), determining whether the current object element has a similar z value to another object element, and when the current object element has a similar z value to the another object element, merging the fragment pixel information of the current object element with fragment pixel information of the another object element.

14. The method of claim 11 further comprises:

determining whether the current object element is fully blocked by the existing object element when the current object element is not closer than the existing object element;

when the fragment pixel is fully blocked by the existing fragment pixel, dropping the fragment pixel information of the current object element, and when the current object element is not fully blocked by the existing object element, appending the fragment pixel information of the existing object element with the fragment pixel information of the current object element.

15. The method of claim 11 further comprises, when the current object element at least partially blocks a portion of the existing fragment pixel, determining coverage of the pixel location by the existing object element and the current object element, and, based on the respective coverages, determining color information contributions of the existing object element and the current object element to pixel information.

16. A video processing unit comprising:

a processing unit; and memory operably coupled to the processing, wherein the memory stores programming instructions that, when read by the processing unit, causes the processing unit to generate a sub-pixel mask for an object element at a pixel location based on a decision corner that is determined by starting at the pixel center, traveling in the major direction to the pixel edge and then on the minor direction to the pixel corner, an error term that is determined from the slope of the triangle edge and said decision corner slope of an edge of the object element, and whether the edge is a left edge or a right edge; receive fragment pixel information pertaining to the object element at the pixel location, wherein the fragment pixel information includes a z value, color information, and the sub-pixel mask; determine visibility of the object element at the pixel location based on the z value and the sub-pixel mask; determine whether the pixel location has been identified as containing a fragment pixel when the object element is at least partially visible; determine whether the object element, at the pixel location, has full coverage and is opaque based on the sub-pixel mask and the color information when the pixel location has not been identified as containing the fragment pixel; and store the color information in a frame buffer and the z value in a z buffer when the object element has full coverage, is opaque, and is fully visible.

17. The video processing unit of claim 16 further comprises, within the memory, programming instructions that, when read by the processing unit, causes the processing unit to:

determine whether the object element is closer than an existing object element corresponding to the fragment pixel information of the existing object element stored in the fragment list;

when the object element is closer than the existing object element, determine whether the object element blocks visibility of the existing object element based on the sub-pixel masks of the existing object element and the object element; and when the object element blocks the visibility of at least a portion of the existing object element, overwrite the at least a portion of the fragment pixel information of the existing object element with the fragment pixel information of the object element.

18. The video processing unit of claim 16 further comprises, within the memory, programming instructions that, when read by the processing unit, causes the processing unit to:

determine whether fragment buffer allocation is available when the object element does not have full coverage or is not opaque;

when fragment buffer allocation is available, save the fragment pixel information of the object element at an allocated address of a frame buffer.

19. The video processing unit of claim 16 further comprises, within the memory, programming instructions that, when read by the processing unit, causes the processing unit to:

determine pixel coverage of the object element from the sub-pixel mask;

when the pixel cover of the object element exceeds a coverage threshold, store the color information in a frame buffer and the z value in a z buffer.

20. A video processing unit comprising:

a processing unit; and memory operably coupled to the processing, wherein the memory stores programming instructions that, when read by the processing unit, causes the processing unit to (a) receive, for a pixel location, pixel information of an object element, wherein the object element is visible at the pixel location; (b) determine whether the pixel information includes fragment pixel information, wherein the fragment pixel information includes a sub-pixel mask, wherein the sub-pixel mask is generated based on a decision corner that is determined by starting at the pixel center, traveling in the major direction to the pixel edge and then on the minor direction to the pixel corner, an error term that is determined from the slope of the triangle edge and said decision corner, slope of an edge of the object element, and whether the edge is a left edge or a right edge; (c) determine whether fragment pixel information has been stored for another object element when the pixel information includes the sub-pixel mask; (d) compare the fragment pixel information of the object element with the fragment pixel information of the another object element when the fragment pixel information has been stored for the another object element; and (e) overwrite at least a portion of the fragment pixel information of the another object element with the fragment pixel information of the object element when the fragment pixel information of the object element compares favorably to the fragment pixel information of the another object element.

21. The video processing unit of claim 20 further comprises, within the memory, programming instructions that, when read by the processing unit, causes the processing unit to: store a portion of the fragment pixel information of the object element when the fragment pixel information of the object element compares unfavorably to the fragment pixel information of the another object element and when the object element is visible at the portion of the fragment pixel information.

22. The video processing unit of claim 20 further comprises, within the memory, programming instructions that, when read by the processing unit, causes the processing unit to: compare a sub-pixel mask of the object element with a sub-pixel mask of the another object element to determine whether the fragment pixel information of the object element compares favorably to the fragment pixel information of the another object element, wherein the fragment pixel information includes the sub-pixel mask.

23. A video processing unit comprising:

a processing unit; and memory operably coupled to the processing, wherein the memory stores programming instructions that, when read by the processing unit, causes the processing unit to (a) determine whether a fragment address exists for a pixel location; (b) determine whether the fragment pixel is closer than an existing fragment pixel corresponding to the fragment address when the fragment address exists, wherein the fragment pixel includes a sub-pixel mask that is generated based on a decision corner that is determined by starting at the pixel center, traveling in the major direction to the pixel edge and then on the minor direction to the pixel corner, an error term that is determined from the slope of the triangle edge and said decision corner, slope of an edge of the object element, and whether the edge is a left edge or a right edge; c) determine based on the sub-pixel masks of the fragment pixel and the existing fragment pixel, whether the fragment pixel blocks visibility of the existing fragment pixel when the fragment pixel is closer than the existing fragment pixel; and (d) overwrite the existing fragment pixel with the fragment pixel when the fragment pixel blocks visibility of the existing fragment pixel.

24. The video processing unit of claim 23 further comprises, within the memory, programming instructions that, when read by the processing unit, causes the processing unit to: when the fragment address does not exist, determine whether the fragment pixel is fully opaque and fully covers the pixel location; when the fragment pixel is fully opaque and fully covers the pixel location, update a z buffer with the fragment pixel, and when the fragment pixel is not fully opaque or does not fully covers the pixel location, drop the fragment pixel.

25. The video processing unit of claim 23 further comprises, within the memory, programming instructions that, when read by the processing unit, causes the processing unit to: determine whether the fragment pixel has a similar z value to another fragment pixel, and when the fragment pixel has a similar z value to the existing fragment pixel, merge the fragment pixel with the existing fragment pixel.

26. The video processing unit of claim 23 further comprises, within the memory, programming instructions that, when read by the processing unit, causes the processing unit to: determine whether the fragment pixel is fully blocked by the existing fragment pixel when the fragment pixel is not closer than the existing fragment pixel, when the fragment pixel is fully blocked by the existing fragment pixel, drop the fragment pixel, and when the fragment pixel is not fully blocked by the existing fragment pixel, append the existing fragment pixel with the fragment pixel.

27. The video processing unit of claim 23 further comprises, within the memory, programming instructions that, when read by the processing unit, causes the processing unit to: when the fragment pixel blocks a portion of the existing fragment pixel, determine coverage of the pixel location by the existing fragment pixel and the fragment pixel, and, based on the respective coverages, determine color information contributions of the existing fragment pixel and the fragment pixel to pixel information.

* * * * *